United States Patent
Miyazawa

(10) Patent No.: US 6,427,444 B1
(45) Date of Patent: Aug. 6, 2002

(54) METHOD AND DEVICE FOR CONVERTING THERMAL ENERGY AND DEVICE WITH THE THERMAL ENERGY CONVERTING DEVICE

(75) Inventor: Kenichi Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/744,504

(22) PCT Filed: May 26, 2000

(86) PCT No.: PCT/JP00/03422

§ 371 (c)(1),
(2), (4) Date: Jan. 30, 2001

(87) PCT Pub. No.: WO00/73654

PCT Pub. Date: Dec. 7, 2000

(30) Foreign Application Priority Data

May 26, 1999 (JP) ............................................. 11-146392

(51) Int. Cl.⁷ .................................................. F01B 1/00
(52) U.S. Cl. ............................................ 60/508; 60/527
(58) Field of Search .......................... 60/508, 515, 527, 60/528

(56) References Cited

U.S. PATENT DOCUMENTS 4,179,893 A * 12/1979 O'Hare ...................... 60/508 X
4,213,292 A    7/1980 Dolezal et al.
5,878,571 A *  3/1999 Kleinwachter et al. ... 60/508 X
6,006,522 A * 12/1999 Foss, Jr. et al. .......... 60/527 X

FOREIGN PATENT DOCUMENTS

| JP | 50-117245 | 9/1975 |
| JP | 55-20483  | 2/1980 |
| JP | 58-106185 | 6/1983 |
| JP | 4-274719  | 9/1992 |
| JP | 10-14265  | 1/1998 |

OTHER PUBLICATIONS

ATMOS, Jacques–Andre Rochat, Jean–Claude Meylan, Jaeger–Le Coultre, Le Sentier 1347 (1997).

* cited by examiner

Primary Examiner—Hoang Nguyen
(74) Attorney, Agent, or Firm—Rosalio Haro

(57) ABSTRACT

A thermal energy conversion device includes a heat converter composed of a medium containing portion (10) that does not substantially change in capacity and a variable portion (11) that is changeable in capacity, an operating portion composed of a piston (13), a pivot lever (15), and a driving lever (16), a first conversion and storage portion formed of a movement barrel (21), and a second conversion and storage portion formed of a power generator (30). When the ambient temperature changes, heating medium contained in the medium containing portion (10) changes in volume, and the capacity of the variable portion (11) is changed, thereby operating the piston (13). Motion of the piston (13) is stored in a mainspring disposed in the movement barrel (21) via the pivot lever (15) and the driving lever (16), and power is generated in the power generator (30).

36 Claims, 12 Drawing Sheets

METHOD AND DEVICE FOR CONVERTING THERMAL ENERGY AND DEVICE WITH THE THERMAL ENERGY CONVERTING DEVICE

TECHNICAL FIELD

The present invention relates to a thermal energy conversion device, a unit having the device, and a thermal energy conversion method, and more particularly, relates to the configuration of a thermal energy conversion device for deriving energy based on changes in pressure or volume of heating medium due to changes in temperature.

BACKGROUND ART

A table clock called "Atmos" from Jaeger-LeCoultre is known as a timepiece in which dynamic energy is obtained by using changes in outside air temperature. Inside this table clock, a deformable sealed container is placed so as to contain ethyl chloride as heating medium in a state which is a mixture of a gaseous phase and a liquid phase. When the internal pressure of the sealed container is changed due to a change in temperature, the sealed container is deformed, and a mainspring is wound up by the deformation, thereby storing energy for driving pointers.

In contrast, techniques for obtaining driving energy for a timepiece by converting thermal energy into dynamic energy in response to a change in ambient temperature, in a manner similar to that of the above-described table clock, are disclosed in, for example, Japanese Unexamined Patent Applications Publication Nos. H6-341371 and H10-14265. Both of these techniques adopt a structure in which liquid and gas are contained as heating media in a sealed container having an expandable bellows, and a driving lever is connected to the sealed container. When the sealed container expands and contracts in response to changes in outside air temperature, the driving lever also moves reciprocally, and rotational motion is generated by a gear meshed with the driving lever. When the rotational motion is transmitted to a rotor of a power generator either directly or via a mainspring or the like, power is generated in the power generator. The generated electrical energy is then stored in a capacitor, a secondary battery, or the like.

In the above techniques, however, since the temperature of outside air generally changes relatively slowly, deformation of the sealed container is considerably slow. As a result, it is difficult to efficiently derive dynamic energy from the deformation of the sealed container.

That is, in the above-described table clock, Atmos, since a coil spring for pressing the sealed container has great elastic force and since the amount of deformation of the sealed container is limited in order to improve pressure resistance of the sealed container, it is impossible to respond to a sudden change in outside air temperature. Moreover, it is also impossible to derive energy from slight changes in the outside air temperature.

In the techniques described in the above publications, in order to efficiently convert thermal energy, deformation of the sealed container is restrained until the outside air temperature changes by some amount, and the restraint force is suddenly released when the amount of change in temperature exceeds a predetermined value, thereby rapidly and greatly deforming the sealed container so as to generate dynamic energy. In this case, it is possible to improve energy conversion efficiency of the power generator, whereas, when rapid increase and decrease in temperature are caused (for example, when the temperature rises rapidly and then falls rapidly), the temperature returns to its initial temperature before the sealed container is released. This does not allow dynamic energy to be obtained. In a case in which the temperature changes slowly, it takes a considerably long time before deriving of thermal energy is started. Furthermore, when the temperature rises and falls before thermal energy can be derived, even if heat is conducted into and out of the sealed container with the rise and fall of the temperature, dynamic energy cannot be derived based on the movement of the heat. Therefore, in the conventional methods, most of the energy, which is supposed to be obtained, cannot be derived and is lost.

DISCLOSURE OF THE INVENTION

The present invention aims to solve various problems in the above-described techniques.

That is, an object of the present invention is to provide a device or method which allows energy in an available form to be quickly or reliably derived even based on a slow temperature change, such as a change in air temperature.

Another object of the present invention is to provide a device or method which can satisfactorily respond to a rapid change in ambient temperature and which can reliably derive energy even when a temperature rise and a temperature fall are almost simultaneously caused within a short period.

A further object of the present invention is to provide a device or method which is highly responsive to various manners of change in ambient temperature and which can efficiently derive energy, for example, which can derive energy with high efficiency over a wide range of rates of change in ambient temperature.

In order to overcome the above problems, a thermal energy conversion device of the present invention includes: a heat converter having a sealed container for containing a heating medium which changes in volume in response to a change in temperature, said sealed container having a medium containing portion, which does not substantially change in capacity, and a variable portion connected to the medium containing portion so as to change in capacity; and an operating portion to be operated in response to a change in capacity of the variable portion. According to the present invention, since the variable portion capable of changing in capacity is connected to the medium containing portion, which does not substantially change in capacity, in the heat converter, when heat is exchanged between the heating medium in the medium containing portion and the outside, the volume of the heating medium changes and causes a change in capacity of the variable portion. In this case, since the medium containing portion does not substantially change in capacity, operations brought about by the capacity change of the heating medium in the medium containing portion are concentrated on the variable portion. This substantially changes the capacity of the variable portion. As a result, it is possible to sensitively and quickly deform the variable portion in response to a considerably slow and slight temperature change, such as a change in ordinary outside air temperature, and in response to a rapid temperature change caused when the device is moved from indoors to outdoors and is returned again to indoors, or when the device is placed out of close contact with the skin and is then put into close contact therewith again, thereby deriving dynamic energy of the operating portion from the deformation. This allows greater energy to be derived than was possible previously. Since a large amount of change in capacity of the variable portion is ensured even when operation thereof is not temporarily restrained, as described in the above publications, or even when the range of change in temperature for limiting the operation is reduced (a set value of the temperature range (temperature difference) for removing the restraint of operation is decreased), it is possible to efficiently derive energy.

In the above heat converter, the description "the capacity of the medium containing portion does not substantially change" means that the capacity of the medium containing portion may be changed to a lower degree than that of the variable portion which changes in capacity in response to the change in volume of the heating medium. The above operating portion refers to a portion that is operated in response to a change in capacity of the variable portion, and refers to all the operating portions mechanically connecting the variable portion and a storage means for storing dynamic energy of the operating portion when the storage means is connected to the operating portion. Therefore, the operating portion may be formed of a single component or a plurality of connected members.

Alternatively, the medium containing portion and the variable portion may be separately formed and be connected to each other, or may be integrally formed. In a case in which the medium containing portion and the variable portion are integrally formed, for example, the medium containing portion may be formed so that it is thick and so that its volume does not substantially change even when the volume of the heating medium contained in the medium containing portion increases or decreases with temperature. In contrast, the variable portion may be formed so that it is thin and so that it is easily changed in capacity and deformed by the increase or decrease in volume of the heating medium.

The medium containing portion may be made of any material that is substantially rigid and has a high thermal conductivity. For example, an aluminum alloy, a copper alloy, a silver alloy, a gold alloy, and the like, which will be described later, are preferable. The variable portion may be made of any material that is likely to change in capacity in response to expansion or contraction of the heating medium due to a temperature change. For example, highly elastic materials, such as rubber, plastic, and a thin elastic metal, which will be described later, are preferable.

The heating medium may be any material that expands or contracts and changes in volume due to a change in temperature. In general, it is preferable that the heating medium be a substance which is in a gas phase or a liquid phase at ordinary temperatures and at ordinary pressures. For example, ammonia, carbon dioxide, and ethylene chloride are preferable. Oxygen, nitrogen, and air may also be used. Alternatively, the heating medium may be an elastic solid which is substantially deformed due to changes in temperature, or be a substance containing a mixture of at least more than two of a gas, a liquid, and a solid.

It is preferable that the surface of the medium containing portion be uneven. Since the surface area of the medium containing portion is increased by having such an uneven form, heat exchange between the heating medium and the outside is promoted. The heat exchange can be further promoted by forming a through portion penetrating the medium containing portion.

In the present invention, it is preferable that the capacity of the variable portion be less than that of the medium containing portion. Since the amount of change in capacity (amount of deformation) of the variable portion can be further increased by setting the capacity of the variable portion to be less than that of the medium containing portion, it is possible to further improve responsivity to temperature changes and to improve sensitivity to temperature changes.

In the present invention, it is preferable that the medium containing portion be extended. Since the ratio of the surface area of the medium containing portion to the capacity can be increased by making the medium containing portion extended, it is possible to increase the amount of heat conducted into and out of the medium containing portion and to further improve responsivity and sensitivity to a temperature change. In this case, it is particularly preferable to use a pipelike (tubular) medium containing portion. In order to make the medium containing portion compact, it is preferable that the outer surface of the extended medium containing portion have a dense integrated structure.

In the present invention, it is preferable that the extended medium containing portion be curved. Since the extended medium containing portion is curved, the device can be made compact, and the medium containing portion can be formed in an appropriate shape in accordance with the structure of the device and the like. This makes it possible to flexibly respond to various arrangement circumstances and to allow applications to small devices and portable devices. In this case, in particular, in a case in which the medium containing portion is pipelike (tubular), it is preferable that the medium containing portion be wound. In order to make the medium containing portion compact, it is preferable that the outer surface of the extended medium containing portion be provided with a dense integrated structure by curving the extended medium containing portion.

In the present invention, it is preferable that the variable portion protrude from the medium containing portion and that the sectional area of the variable portion taken along a plane orthogonal to the protruding direction of the variable portion be less than the sectional area of the medium containing portion taken along the plane in an area connected to the variable portion. In other words, it is preferable that the sectional area taken along a plane orthogonal to a direction from the medium containing portion toward the variable portion be reduced in the medium containing portion. When the variable portion protrudes outward from the medium containing portion and the sectional area thereof is less than that of the medium containing portion, it is possible to further increase the amount of deformation of the variable portion based on a change in volume in the protruding direction and to further increase the amount of dynamic energy to be transmitted to the operating portion. In this case, in order to increase the amount of energy to be derived, it is more preferable that the variable portion be deformable (or expandable) only in the above protruding direction.

In the present invention, it is preferable that the variable portion be expandable in a predetermined direction and that the operating portion be reciprocally movable in the predetermined direction in response to expansion and contraction of the variable portion. When the variable portion is expandable in a predetermined direction and the operating portion is reciprocally movable in the predetermined direction, dynamic energy generated by deformation of the variable portion due to a change in capacity can be derived only in the predetermined direction. This makes it possible to increase the operation stroke of the operating portion and to thereby derive energy more efficiently.

In the present invention, it is preferable to further include a storage means for storing the dynamic energy of the operating portion. In this case, it is preferable that the storage means store the dynamic energy of the operating portion after converting the dynamic energy into another form of energy. In a case in which the operation manner of the operating portion is not suited to continuous supply of energy, energy derived from the operating portion is stored in the storage means, and the stored energy can be thereby continuously supplied. The storage means includes a means for storing dynamic energy after converting the dynamic energy into strain energy of an elastic member, such as a mainspring, a coil spring, or a torsion spring, a means for storing dynamic energy after converting the dynamic energy into potential energy in accordance with the raised position of a weight or the like, a means for storing dynamic energy after converting the dynamic energy into rotation moment of a rotating member, such as a flywheel, and a means for storing dynamic energy after converting the dynamic energy into electrical energy by using a power generator or a piezoelectric device.

In the present invention, it is preferable that the storage means have a first storage portion for temporarily storing dynamic energy of the operating portion, and a second storage portion for converting and storing the energy output from the first storage portion. Dynamic energy of the operating portion to be operated in response to a change in capacity of the variable portion is converted and temporarily stored in the first storage portion, and the energy output from the first storage portion is stored again in the second storage portion. This makes it possible to temporarily store energy in the first storage portion, which is responsible to the operation manner of the operating portion or is suited to the operation manner of the operating portion with respect to conversion efficiency, even when the operation manner of the operating portion does not readily improve the efficiency of energy conversion, for example, when the action of the operating portion produced by a change in ambient temperature is irregular, or when the amount of action substantially varies with time, and to store the energy output from the first storage portion after converting the energy again into a desired form of energy or a more available form of energy. This allows both improvement of energy deriving efficiency and broadening of the range of choice of forms of energy.

In the present invention, it is preferable that the change in energy conversion efficiency of the first storage portion with respect to the amount of input energy be gentler than that of the second storage portion. When the change in energy conversion efficiency of the first storage portion with respect to the amount of input energy is gentler than that of the second storage portion, it is possible to respond over a broad range to an increase in amount of input energy due to a rapid temperature change and a decrease in amount of input energy due to a slow temperature change, and to improve energy deriving efficiency. Furthermore, the range of choice of means for converting and storing energy can be extended by converting the energy again by the second storage portion.

In the present invention, it is particularly preferable that the energy conversion efficiency of the first storage portion with respect to a small amount of energy be higher than that of the second storage portion. Since ordinary changes in ambient temperature are considerably slow in general, the amount of energy to be input to the first storage portion is also considerably small in ordinary cases. Even a small amount of energy can be continuously converted and stored by using the first storage portion having a high conversion efficiency for a small amount of energy, and this can increase the total amount of energy which can be derived.

For example, in the power generator for converting dynamic energy into electrical energy, manageable energy can be obtained, whereas the energy conversion efficiency rapidly decreases when the amount of dynamic energy to be input decreases. In contrast, in a case in which the mainspring is wound up by input energy, mechanical loss is inevitable, whereas the conversion efficiency can be maintained even when a small amount of input energy is applied.

In the present invention, it is preferable to further include a control means for controlling the amount of energy to be fed from the first storage portion to the second storage portion. Since the amount of energy to be fed from the first storage portion to the second storage portion can be controlled by the control means, the amount of energy to be temporarily stored in the first storage portion and the energy conversion speed of the second storage portion can be adjusted, as necessary. Therefore, for example, the energy conversion efficiency of the overall device can be improved by controlling the amount of energy to be fed from the first storage portion within the range of feeding speeds that allow a superior energy conversion efficiency of the second storage portion. In a case in which there is provided a working section (energy consuming portion) for consuming the energy stored in the second storage portion, only energy necessary for the working section can be fed to the second storage portion to be converted. Furthermore, in a case in which the working section for consuming energy is placed between the first storage portion and the second storage portion, the operating state of the working section can be controlled by controlling the amount of energy to be fed from the first storage portion to the second storage portion.

In the present invention, it is preferable that the control means control the feeding amount so as to reduce changes in the amount of energy to be stored in the second storage portion and that the second storage portion be connected to an energy consuming portion for consuming the energy stored in the second storage portion. When changes in amount of energy to be stored in the second storage portion are reduced by the control means, the first storage portion has an effective buffer action in the flow path of energy to the energy consuming portion. For example, the amount of energy stored in the second storage portion increases or decreases in accordance with the amount of energy consumed by the energy consuming portion, and, according to the increase or decrease, the amount of energy to be fed from the first storage portion to the second storage portion decreases or increases. Therefore, in a case in which there is a limit to the amount of energy to be stored in the first storage portion and the second storage portion, energy storage ability of the overall system can be efficiently used, and the amount of energy which can be derived by the overall system can be substantially increased.

In the present invention, it is preferable that the control means exert control so that the feeding amount is constant. When control is exerted so that the amount of energy to be fed from the first storage portion to the second storage portion is constant, it is possible to carry out stable energy conversion in the second storage portion and to thereby efficiently derive energy. For example, the amount of practically available energy can be increased by setting the energy feeding amount in accordance with the conversion speed that allows the highest energy conversion efficiency of the second storage portion.

In a case in which a driven portion for consuming energy is placed between the first storage portion and the second storage portion and is driven in an operation manner in accordance with the feeding amount of energy, the working state (operation manner) of the driven portion can be maintained constant by controlling the amount of energy to be fed from the first storage portion to the second storage portion. Accordingly, it is possible to construct a timepiece having a pointer as the driven portion, in which energy is transmitted from the first storage portion to the second storage portion at a constant rate of rotation.

In the present invention, it is preferable that the first storage portion be a mechanical energy storage means for converting dynamic energy of the operating portion into mechanical energy, such as strain energy, potential energy, or rotational energy, and temporarily storing the converted energy, and that the second storage portion have a power-generating means for converting energy output from the first storage portion into electrical energy and a storage means for storing the electrical energy obtained from the power-generating means. The first storage portion may include a means for storing dynamic energy after converting the dynamic energy into elastic strain energy by using an elastic member, such as a mainspring, a coil spring, or a torsion spring, a means storing dynamic energy after converting the dynamic energy into potential energy of a weight, and a means for storing dynamic energy after converting the dynamic energy into rotation moment by using a flywheel or the like. The second storage means may include a means, such as a power generator or a piezoelectric device, for storing energy after converting the energy into electrical energy.

The above-described thermal energy conversion device of the present invention is applicable to various devices. In various devices having a working section for consuming energy, a change in capacity of a variable portion connected to a medium containing portion caused by a change in ambient temperature is derived as dynamic energy of an operating portion, and the working section can be driven by using the energy in an unchanged form or after being appropriately converted into another form of energy. Examples of the devices are electronic devices to be operated by electrical energy converted from thermal energy, timepieces directly utilizing dynamic energy converted from thermal energy, and timepieces to be driven by using electrical energy converted from thermal energy. While portable devices require a battery or the like as an energy source, the use of the present invention can eliminate the need for an energy source itself, or can eliminate the need to replace the energy source by appropriately resupplying energy to the energy source.

In the present invention, it is preferable that a case member be provided to house the thermal energy conversion device and that the medium containing portion be placed along the inner surface of the case member. Components other than the thermal energy conversion device may be housed in the case member, as necessary. Since heat can be efficiently exchanged between the medium containing portion and the case member by placing the medium containing portion along the inner surface of the case member, it is possible to improve responsivity and sensitivity to changes in ambient temperature.

In the present invention, it is preferable that the case member and the outer wall of the medium containing portion be in close contact with each other or be integrally formed. When the case member and the outer wall of the medium containing portion are in close contact with each other or are integrally formed, heat can be more efficiently exchanged between the medium containing portion and the outside. This further improves responsivity and sensitivity to changes in ambient temperature. It is preferable that the surface in close contact with the case member or the outer wall formed integrally with the case member be uneven so as to increase the contact area (the area in close contact) or the surface area. When the close contact surface is uneven, it is preferable that the medium containing portion and the case member be engaged with each other through the uneven surface.

In the present invention, it is preferable that the case member be provided with a heat path extending from the outer surface of the case member to a position facing the medium containing portion and having a higher thermal conductivity than that of other portions. Since heat is conducted in and out preferentially through the heat path having a high thermal conductivity in the medium containing portion, thermal energy can be selectively derived by contacting the outer surface of the case member having the heat path with a specific heat source (e.g., the outside air). In a portable device such as a wristwatch, or in an accessory jewelry or the like), it is preferable that the heat path extend from a portion of the outer surface of the casing member of the device, other than the portions in contact with the body and clothing, which is exposed to outside air, toward the medium containing portion.

In the present invention, it is preferable that the case member selectively have an uneven shape on a portion of the outer surface facing the medium containing portion. Since an uneven shape is selectively provided on a portion of the outer surface of the case member facing the medium containing portion, the surface area of the case member is selectively increased at the portion of the outer surface. This allows heat to be conducted into and out of the medium containing portion preferentially through that portion.

In the present invention, it is preferable that a portion of the case member adjacent to the medium containing portion selectively have a heat-insulating portion having a lower thermal conductivity than that of other portions. When the heat-insulating portion is selectively formed, heat exchange between the medium containing portion and the outside is hindered at the portion with the heat-insulating portion. Therefore, in a case in which a portion of the outer surface of the case member is in contact with a heat source, which barely change in temperature, changes in temperature of the medium containing portion are prevented from being restrained by the thermal influence of the portion, and the amount of energy to be derived is prevented from being reduced. For example, in the case of a portable device such as a wristwatch, or an accessory jewelry or the like), changes in temperature of the medium containing portion can be prevented from being hindered by the influence of body heat, clothing, and the like by selectively forming a heat-insulating portion in a part of the case member in contact with the body and clothing.

In a thermal energy conversion method of the present invention, a heat converter is formed so as to have a sealed container for containing a heating medium that changes in volume in response to a temperature change, and the sealed container has a medium containing portion that does not substantially change in capacity and a variable portion connected to the medium containing portion so as to be changeable in capacity. A change in volume is caused in the variable portion by changing the internal temperature of the medium containing portion based on a change in outside air temperature, and dynamic energy is generated by the change in volume.

In another thermal energy conversion method of the present invention, a heat converter is formed to have a sealed container for containing a heating medium that changes in volume in response to a temperature change, and the sealed container has a medium containing portion that does not substantially change in capacity and a variable portion connected to the medium containing portion so as to be changeable in capacity. A change in volume is caused in the variable portion by shifting the medium containing portion from a state in which it is in thermal contact with a first heat source to a state in which it is in thermal contact with a second heat source having a different temperature from that of the first heat source, and dynamic energy is generated by the change in volume.

For example, in a case in which a portable device, an accessory (for example, jewelry), or the like having the heat converter therein is worn, the medium containing portion is in thermal contact with the body, clothing, or the like (first heat source). When the portable device, the accessory, or the like is not worn, the medium containing portion is in thermal contact with the outside air, a table, the floor, or the like (second heat source). In general, a certain temperature difference is created between the states in which the device is worn and in which it is not worn. The variable portion is deformed due to a temperature change every time the portable device (e.g., a portable telephone or a wristwatch) and the accessory are put on or are taken off, thereby deriving dynamic energy.

In a more specific thermal energy conversion method of the present invention, a heat converter is formed to have a sealed container for containing a heating medium that changes in volume in response to a temperature change, the sealed container has a medium containing portion that does not substantially change in capacity and a variable portion connected to the medium containing portion so as to be changeable in capacity. A first outer face portion to be contacted with a first heat source and a second outer face portion to be contacted with a second heat source, which changes in temperature to a greater degree than that of the first heat source, are formed on the periphery of the medium containing portion, and heat exchange efficiency between the outside and the medium containing portion via the first outer face portion is lower than the heat exchange efficiency between the outside and the medium containing portion via the second outer face portion.

For example, in the case of a portable device such as a wristwatch, or an accessory jewelry or the like), thermal conductivity of a portion of the case (e.g., a case back) having the first outer face portion in contact with the body and clothing is set to be lower than that of a portion of the case (e.g., the rim of a timepiece case) having the second outer face portion exposed to the outside air. This makes it possible to reliably transmit a change in outside air temperature into the medium containing portion, to allow the temperature of the medium containing portion to follow a change in the outside air temperature without being hindered by a steady thermal environment such as that of the body and clothing, and to derive energy with high efficiency.

BEST MODE FOR CARRYING OUT THE INVENTION

Embodiments of a thermal energy conversion device, a unit having the device, and a thermal energy conversion method according to the present invention will be described below in detail with reference to the drawings.

[First Embodiment]

Figure 1:
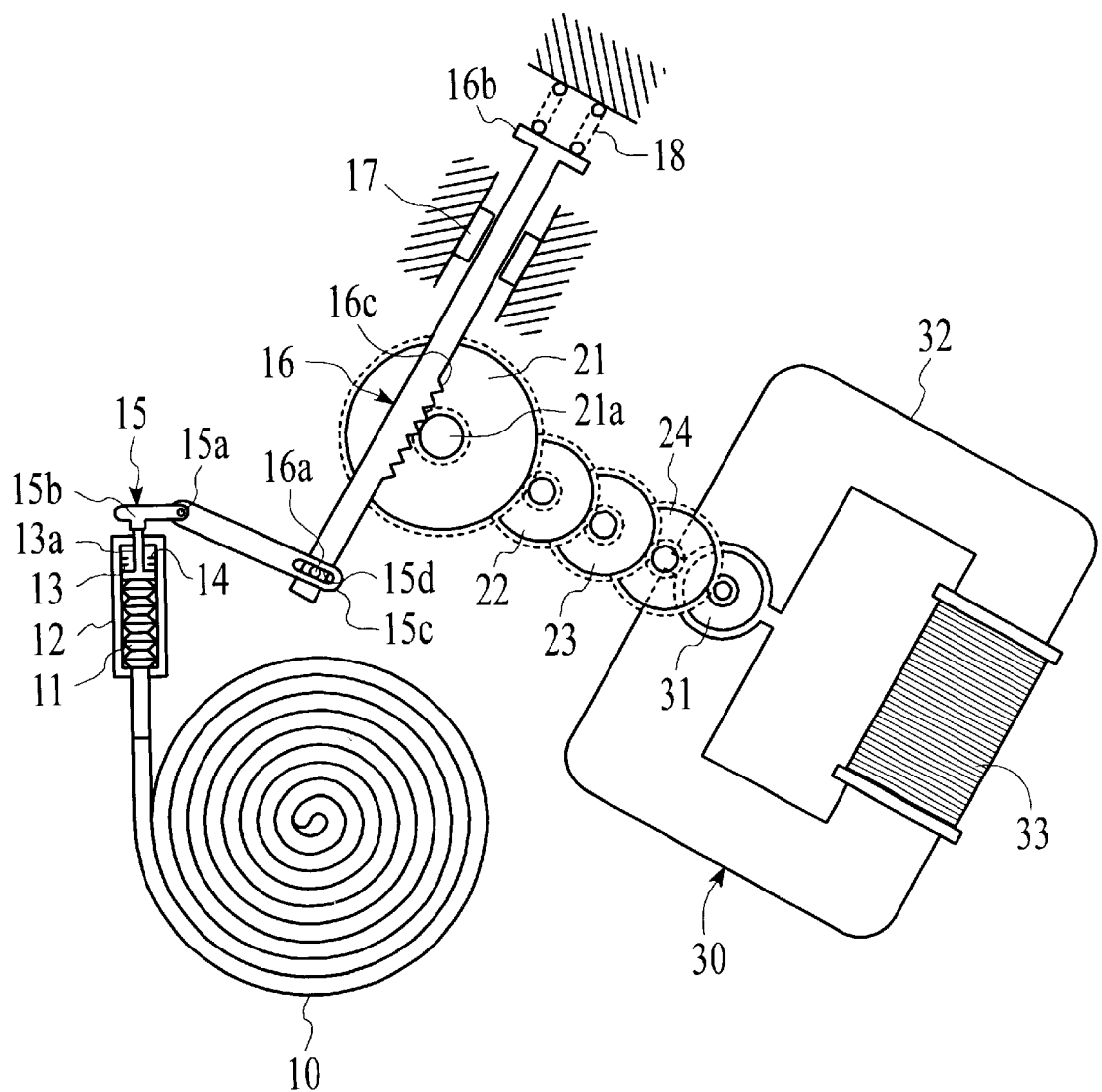
FIG. 1 is a general structural view of a thermal energy conversion device according to a first embodiment of the present invention.

FIG. 1 is a general structural view of a thermal energy conversion device according to a first embodiment of the present invention. In this embodiment, a medium containing portion 10 and a variable portion 11 are heat converters having a sealed container structure so as to contain heating medium therein. In this embodiment, thermal energy is derived based on changes in temperature by using the heat converter so as to operate an operating portion, and energy is derived from the operating portion via a transmitting section for energy transmission and a converting section for energy conversion.

The medium containing portion 10 is basically made of a rigid material, such as a metal that will be described later, which does not substantially change in capacity due to a change in pressure of heating medium contained therein.

The variable portion 11 is deformable in accordance with the pressure of heating medium therein. Therefore, a change in pressure of the heating medium contained in the medium containing portion 10 changes the volume and shape of the variable portion 11 connected to the medium containing portion 10.

The medium containing portion 10 is shaped like an extended pipe and is placed in a spiral form. The medium containing portion 10 is closed at the tail end and is connected to the expandable variable portion 11 at the base end. The variable portion 11 is formed of a tubular bellows container and is made of a highly elastic material, such as rubber, plastic, or thin metal. The variable portion 11 is more likely to be deformed in the longitudinal direction (axial direction) than in the radial direction. In general, it is preferable that the variable portion have a highly elastic container structure that is more likely to deform in a predetermined direction than in other directions.

The variable portion 11 is housed in a cylinder 12. A piston 13 is movably placed inside the cylinder 12, and one side thereof is in contact with the variable portion 11. An elastic member 14, such as a coil spring, is held on the other side of the piston 13 so as to press the piston 13 against the variable portion 11. The piston 13 has a driving shaft 13a protruding from the cylinder 12. The driving shaft 13a is rotatably connected to a driven end 15b of a pivot lever 15 that is able to pivot on a pivot shaft 15a. The pivot lever 15 has a driving end 15c on the side opposite from the driven end 15b, and the driving end 15c has a slot 15d. The slot 15d passes a connecting shaft 16a formed at the end of a driving lever 16 therethrough, thereby pivotally connecting the pivot lever 15 to the driving lever 16.

The driving lever 16 is guided by a bearing 17 so as to linearly move in the axial direction. An elastic member 18, such as a compressed coil spring, is in contact with an end portion 16b of the driving lever 16, and the driving lever 16 is pressed by the elastic member 18 toward the connecting shaft 16a. In this case, the end portion 16b may be engaged with an elastic member, such as a torsion spring, so that the driving lever 16b is drawn toward the end portion 16b by the elastic member. A rack 16c extending in the axial direction of the driving lever 16 is formed on the outer peripheral surface of the driving lever 16, and is meshed with a driven gear 21a attached to a movement barrel 21 with a mainspring therein.

Figure 5:
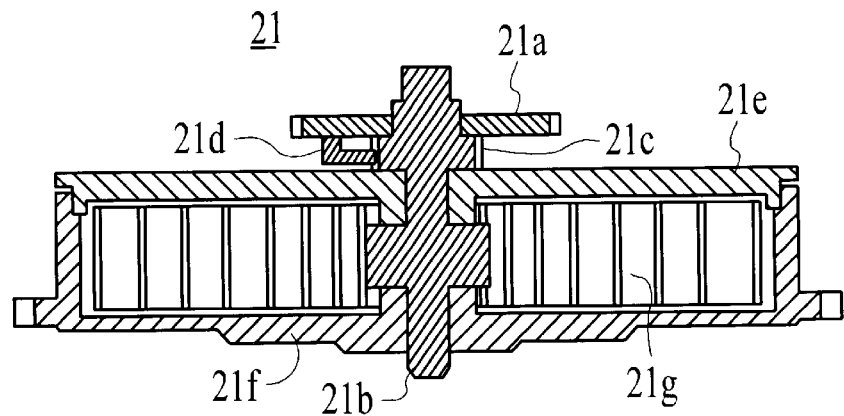
FIG. 5 is a general sectional view showing the structure of a movement barrel for use in the embodiments of the present invention.

As shown in FIG. 5, the driven gear 21a is supported by a shaft member 21b of the movement barrel 21 so as to rotate thereon, and a ratchet pawl 21d fixed to the driven gear 21a is engaged with a shaft gear 21c formed in a part of the shaft member 21b. While the ratchet pawl 21d engages with the shaft gear 21c when the driven gear 21a is rotated clockwise in FIG. 1, it does not engage therewith when the driven gear 21a is rotated counterclockwise in FIG. 1. As a result, the clockwise rotation of the driven gear 21a is transmitted to the shaft gear 21c, whereas the counterclockwise rotation thereof is not transmitted to the shaft gear 21c.

The shaft member 21b is rotatably fitted in an upper casing 21e, and an output gear 21f is rotatably attached to the shaft member 21b and the upper casing 21e. A mainspring 21g is attached to the shaft member 21b at the inner end and is fixedly attached to the output gear 21f at the outer end. When the shaft gear 21c is rotated by the ratchet pawl 21d, the mainspring 21g is wound up. The mainspring 21g serves as a means for storing rotational energy as elastic strain, and the movement barrel 21 serves as a first conversion and storage portion for converting and storing dynamic energy of the driving lever 16. The output gear 21f is rotated by elastic force of the mainspring 21g.

Referring again to FIG. 1, description will be given. Rotation transmitted to the movement barrel 21 winds up the mainspring 21g and rotates the output gear 21f. The rotation of the output gear 21f is increased in speed via a plurality of gears 22, 23, and 24 constituting a transmission gear train, thereby rotating a rotor 31 of a power generator 30. The power generator 30 comprises the rotor 31, a stator 32, and an electromagnetic coil 33. Electromotive force is generated in the electromagnetic coil 33 by the rotation of the rotor 31.

In this embodiment, heating medium is sealed in the medium containing portion 10 in a state in which the liquid phase and the gaseous phase are mixed (coexist) at ordinary temperature. While various substances, which change in volume with temperature, may be used as the heating medium, in general, it is preferable to use a substance which is in a gaseous or liquid state at ordinary temperature and at ordinary pressure. For example, ammonia, carbon dioxide, ethyl chloride, or the like is preferable. While oxygen, nitrogen, air, or the like may be used, since it needs to be sealed in the heat converter at a higher pressure than atmospheric pressure in order to obtain a sufficient amount of change in volume, the heat converter composed of the medium containing portion 10 and the variable portion 11 must have such a high pressure resistance as to withstand high pressure.

In this embodiment, when the temperature of the heating medium contained in the medium containing portion 10 changes in response to a change in ambient temperature, internal pressure is changed and the variable portion 11 is deformed. As a result, the piston 13, the pivot lever 15, and the driving lever 16 described above are operated. The movement of the driving lever 16 is temporarily stored as elastic strain in the movement barrel 21. The rotation output of the output gear 21f produced by the elastic energy stored in the movement barrel 21 is increased in speed and is converted into electrical energy by the power generator 30.

In a state in which ambient temperature is normal outside air temperature, since changes in the temperature are irregular, the movement of the driving lever 16 is also irregular. Since the mainspring 21g has the property of continuously outputting rotational force which is relatively unlikely to be influenced by the amount of stored elastic strain and which barely changes, it allows the rotor 31 of the power generator 30 to be rotated in a state in which the amount of change in rotating speed is relatively small. This can make power-generating efficiency higher than in a case in which the rotor 31 is directly rotated by the driving lever 16.

In this embodiment, the heat converter is divided into the medium containing portion 10 and the variable portion 11, and only the variable portion 11 changes in volume in response to a change in pressure of the heating medium in the medium containing portion 10. For this reason, the ratio of the capacity of the variable portion 11 to the total capacity of the heat converter can be reduced (to less than 1) by forming the medium containing portion 10 separately from the variable portion 11, compared with a case in which the entire container (heat converter) containing a heating medium serves as a variable portion (the ratio of the capacity of the variable portion 11 to the total capacity of the heat converter is 1), as disclosed in Japanese Unexamined Patent Application Publication Nos. H6-341371 and H10-14265. This makes it possible to increase the amount or stroke of change of the variable portion 11 in response to changes in pressure.

Since thermal responsivity can be made higher than previously, even when ambient temperature suddenly changes and then returns to its initial temperature, the variable portion 11 responds thereto and deforms so as to derive energy. Furthermore, since heat sensitivity can be made higher than previously, even when ambient temperatures slightly changes, the amount of deformation of the variable portion can be increased so as to derive energy. As a result, it is unnecessary to take measures to temporarily restrain deformation of the variable portion and to release and suddenly deform the variable portion at the time when the amount of change in temperature increases to some extent in order to efficiently derive energy by increasing the amount of change in deformation of the variable portion to some extent, as in the conventional art. Alternatively, since the necessity of taking the above measures is reduced, it is possible to reduce the degree of restraint of deformation of the variable portion (the difference in temperature made until the restraint of deformation is removed). Since the efficiency of deriving energy based on temperature changes can be increased as a whole, this method, which has not been practical before, can be applied to various everyday devices, such as a wristwatch.

In this embodiment, the capacity of the medium containing portion 10 is set to be greater than the standard capacity of the variable portion 11 (an approximately medium capacity value in the practical range of capacity changes of the variable portion 11), that is, the ratio of the capacity of the medium containing portion 10 and the standard capacity of the variable portion 11 is set to be 1 or more, more preferably, 2 or more. This makes it possible to effectively increase the amount of deformation of the variable portion 11. In this embodiment, the capacity of the medium containing portion 11 is set to be more than ten times the standard capacity of the variable portion 11.

In this embodiment, in particular, since the medium containing portion 10 is formed in an extended shape (in the shape of a pipe or tube), the surface area thereof can be easily increased, which allows heat to be efficiently exchanged with the outside. By being placed in a curved (wound) form, the extended container can be housed in a compact space in various devices. Furthermore, the medium containing portion 10 can be easily put in various devices by being made of, for example, a flexible material, so as to be curved in an arbitrary shape. Since the pressure strength to internal pressure can be increased by forming the medium containing portion 10 in a pipelike (tubular) shape as in this embodiment, the range of choice of materials of the medium containing portion 10 can be extended. Moreover, since the medium containing portion 10 can be operated with high-pressure heating medium held therein, it is possible to more efficiently derive energy.

[Second Embodiment]

A second embodiment of the present invention will now be described in detail with reference to FIG. 2. In this embodiment, a medium containing portion 40 is shaped like a cube. The medium containing portion 40 is connected to a variable portion 41 that is similar to that in the first embodiment. A cylinder 42, a piston 43, and an elastic member 44 are also similar to those in the first embodiment. A driving shaft 43a of the piston 43 is connected to a driving lever 46 via a pin 45. The driving lever 46 is provided with a connecting end 46a connected to the pin 45, 15 a pressed end 46b to be pressed by an elastic member 48 that is similar to that in the first embodiment, and a rack 46c. The driving lever 46 is guided by a bearing 47 so as to reciprocally move in the axial direction.

The rack 46c of the driving lever 46 is meshed with a first gear 51, and the first gear 51 increases the speed of the motion of the driving lever 46. The first gear 51 is meshed with a driven gear 52a of a movement barrel 52. The movement barrel 52 has the same structure as that of the movement barrel 21 in the first embodiment. The rotation of an output gear of the movement barrel 52 is further increased in speed via gears 53, 54, 55, and 56, thereby rotating a rotor 61 of a power generator 60. The power generator 60 comprises the rotor 61, a stator 62, and an electromagnetic coil 63, in a manner similar to that of the first embodiment.

In this embodiment, the medium containing portion 40 is shaped like a rectangular parallelepiped, and contains therein heating medium similar to that in the first embodiment. The medium containing portion 40 is structured to have a capacity more than ten times the standard capacity of the variable portion 41. Therefore, in a manner similar to that in the above first embodiment, when the pressure of the heating medium contained in the medium containing portion 40 is changed due to a change in ambient temperature and the volume thereof starts to increase, the capacity of the variable portion 41 is also substantially increased in response thereto, and the driving lever 46 moves in the axial direction. Dynamic energy of the driving lever 46 is temporarily stored in a mainspring of the movement barrel 52. The energy stored in the mainspring rotationally drives the rotor 61, so that power is generated in the power generator 60.

While rotation is transmitted to the movement barrel when the driving lever, which is reciprocally movable, is moved only in one direction, in the above embodiments, it can be transmitted so as to store energy when the driving lever is moved in both reciprocating directions by a known means.

It is preferable that the medium containing portions 10 and 40 of the above embodiments be made of a material having high thermal conductivity, such as an aluminum alloy or a copper alloy. In particular, the use of such a metal material makes it possible to easily ensure pressure strength necessary to hermetically seal the heating medium.

[First Modification]

Figure 3:
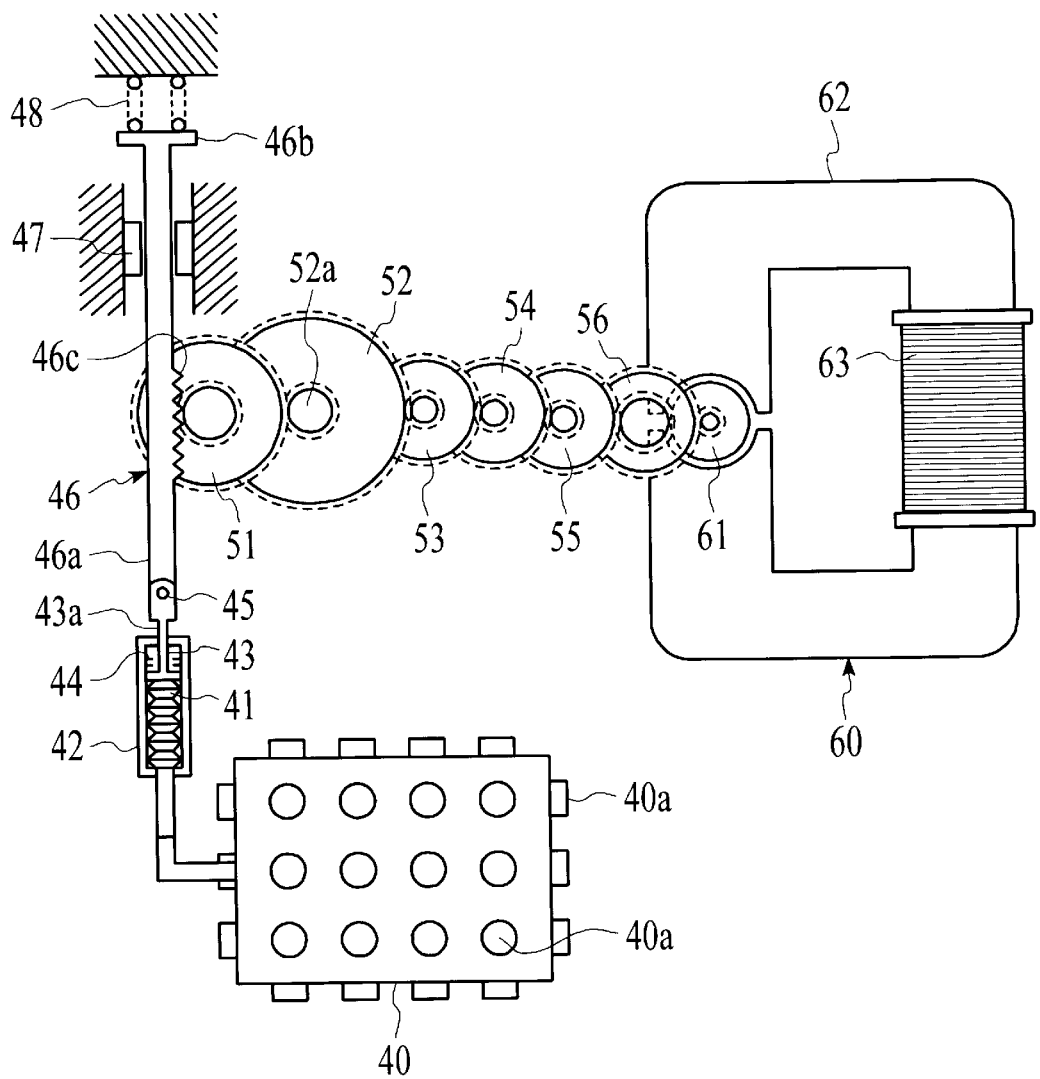
FIG. 3 is a general structural view showing the configuration of a modification of the second embodiment.

FIG. 3 shows the configuration of a modification of the above-described second embodiment. In this modification, multiple (a plurality of) protuberances 40a are formed on the surface of a medium containing portion 40. While the protuberances 40a may be formed by partly thickening the outer wall of the medium containing portion 40, it is more preferable that they be formed as if the outer wall of the medium containing portion 40 was hammered from inside, that is, that convex spaces be formed at the outer edges of a space in the medium containing portion 40 where heating medium is contained. While the protuberances 40a in this embodiment are formed on all the six faces of the medium containing portion 40 shaped like a rectangular parallelepiped, they may be formed only on the limited faces.

In this modification, since the protuberances 40a are formed on the faces of the medium containing portion 40, the surface area of the medium containing portion 40 is made larger than that in the above second embodiment, and as a result, heat exchange between the heating medium in the medium containing portion 40 and the outside is promoted. This makes it possible to improve usage efficiency of thermal energy and thermal responsivity and to increase the efficiency of deriving energy.

As the structure formed on the surface of the medium containing portion 40 for promoting thermal exchange, the above-described protuberances may be replaced with multiple recesses. Both the protuberances and the recesses may be formed as the structure.

[Second Modification]

Another embodiment will now be described with reference to FIG. 4.

Figure 4A:
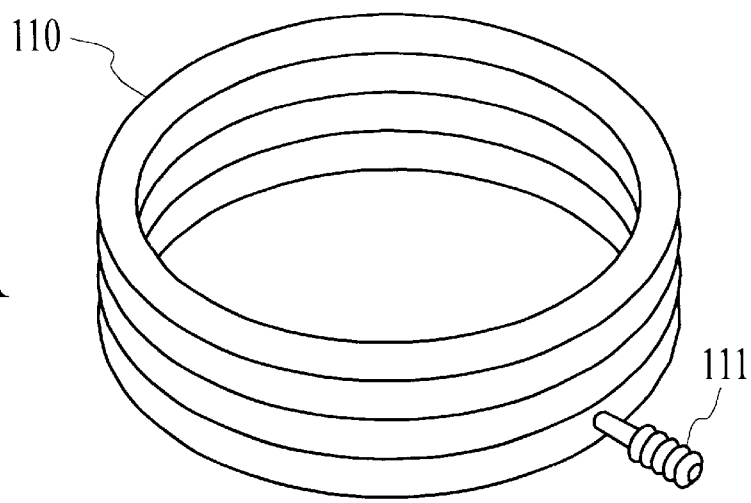
FIGS. 4(*a*) to 4(*c*) are general perspective views showing modifications of the principal part of the thermal energy conversion device according to the present invention.

FIG. 4(a) shows a modification (second modification) of the heat converter of the first embodiment shown in FIG. 1. A medium containing portion 110 is formed by winding a pipelike (tubular) member in an annular form so as to form a stack of turns. The medium containing portion 110 may be formed by stacking a plurality of ring-shaped pipe portions and partly connecting the interiors of the pipe portions to one another, or may be shaped in the stacked form as in the figure by spirally winding a long pipelike member. A variable portion 111 protrudes from a part of the medium containing portion 110. The variable portion 111 has a bellows structure such as to be expandable in the protruding direction, in a manner similar to that in the first embodiment. In this modification, the medium containing portion 110 can be placed so as to circle along the inner side face of the casing, as will be described later, ambient temperature can be efficiently taken into heating medium in the medium containing portion 110 without hindering the size reduction of the device.

[Third Modification]

Figure 2:
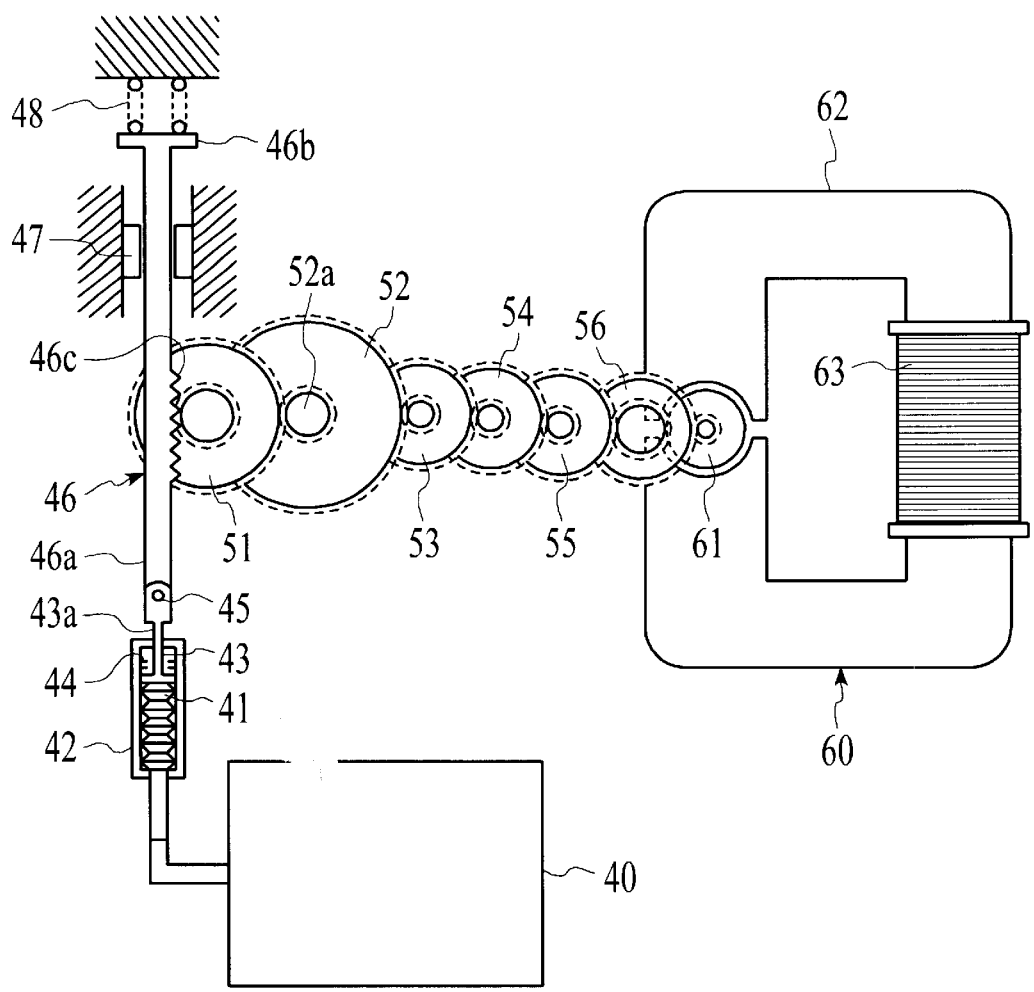
FIG. 2 is a general structural view of a thermal energy conversion device according to a second embodiment of the present invention.
Figure 4B:
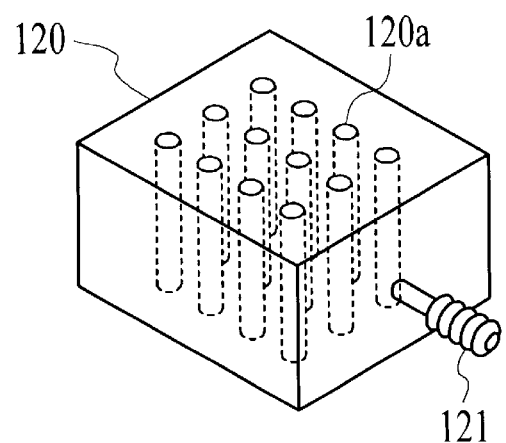

FIG. 4(b) shows a modification (third modification) of the second embodiment shown in FIGS. 2 and 3, in which a medium containing portion 120 shaped like a nearly rectangular parallelepiped is provided. An expandable variable portion 121, which is similar to that in the above, protrudes from the side face of the medium containing portion 120. In the medium containing portion 120, a plurality of through portions 120a are formed with openings on two opposing faces thereof (upper and lower surfaces in the figure). The through portions 120a are formed so that cylindrical inner walls are passed through the interior of the medium containing portion 120, and the inner walls are fixed by, for example, welding in order to ensure high sealing performance of the medium containing portion 120. By thus forming the through portions 120a, the surface area of the medium containing portion 120 can be increased. In particular, since ambient temperature can be easily transmitted to the center portion of the medium containing portion 120, where heat exchange with the outside is reduced, via the through portions 120a, it is possible to improve thermal responsivity to temperature changes of the medium containing portion 120 and to sufficiently deform the variable portion 121 in response to even a small change in temperature.

[Fourth Modification]

Figure 4C:
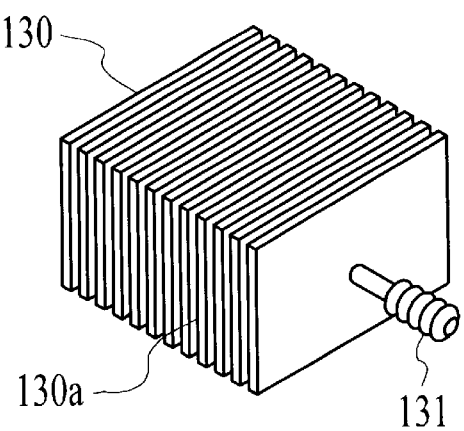

FIG. 4(c) shows another modification (fourth modification) of the second embodiment shown in FIGS. 2 and 3. Multiple fins 130a shaped like pleats are formed on the outer faces (four faces adjoining in the circling direction, that is, the upper face, the lower face, and two side faces in the figure) of a medium containing portion 130 shaped like a nearly rectangular parallelepiped. The fins 130a are formed to make the outer faces uneven and can increase the surface area of the medium containing portion 130. Accordingly, it is possible to improve responsivity to temperature changes and to sufficiently deform a variable portion 131 in response to even a small change in temperature.

In both the above-described first and second embodiments, dynamic energy of the operating portion to be operated by deformation of the variable portion is temporarily stored in the mainspring, and the power generator is operated by the output from the mainspring so as to generate electric power, thereby deriving electrical energy. Such a mechanism serves to reliably capture dynamic energy generated in response to a temperature change, which is irregular and highly variable with time, by the mainspring without any great influence of the energy amount, such as motion stroke and motion velocity, and to transmit the energy stored in the mainspring so as to conform to the power-generating characteristics of the power generator as closely as possible. In particular, in a case in which the amount of deformation of the variable portion is increased by forming the medium containing portion as in the present invention, it is possible to efficiently seize a sudden temperature change and a considerably slow temperature change and to thereby operate the operating portion. Therefore, it is significantly efficient to adopt the above-described method for temporarily capturing dynamic energy, which widely varies, and outputting and converting the dynamic energy again. This plays a big part in increasing the efficiency of deriving energy. Furthermore, great advantages can be obtained by controlling the amount of energy to be sent from the mainspring to the power generator, as shown in first and second applications which will be described later.

[First Application]

Description will now be given of the configuration of a first application in which the above-described first and second embodiments are actually applied to various devices. While the first embodiment is principally applied in this application in the following description, the second embodiment may be similarly applied.

Figure 6:
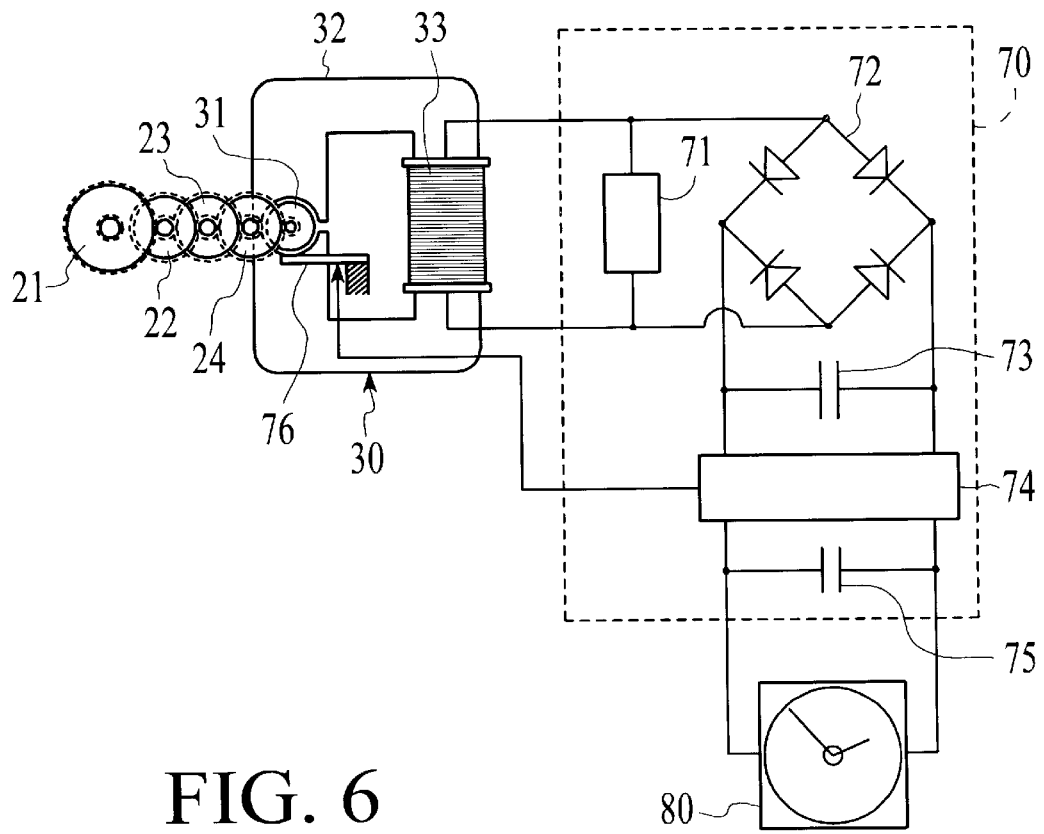
FIG. 6 is a general structural view showing the electrical configuration of a first application to which the embodiments of the present invention are applied.

As shown in FIG. 6, a power generator 30 having a rotor 31, which is rotationally driven by rotation transmitted from a movement barrel 21 via gears 22, 23, and 24, outputs electric power to a power control section 70. In the power control section 70, a power consuming section 71 connected in parallel to the output end of the power generator 30 in order to keep the power-generation load substantially constant, a rectifying circuit 72 for rectifying alternating current output from the power generator 30 and converting the alternating current into direct current, a smoothing capacitor 73 placed on the output side of the rectifying circuit 72, a voltage increasing and decreasing circuit 74 capable of controlling the load power of the power generator 30, as will be described later, and an auxiliary capacitor 75 are connected in parallel. The output of the auxiliary capacitor 75 is connected to a working section (energy consuming section) 80 composed of a timepiece control circuit, a stepping motor, and the like (in the case of a timepiece). The auxiliary capacitor 75 serves to stabilize power to be supplied to the working section 80.

In the above embodiments, the mainspring is spirally wound. The mainspring is wound up to store energy and is unwound to output stored energy. Therefore, when a predetermined load (torque) is applied to the output side of the mainspring, energy corresponding to the load can be output for a long period. In contrast, when no load is applied to the output side of the mainspring, the mainspring is rapidly unwound and stored energy is immediately dissipated. Accordingly, in this application, when the amount of power to be consumed by the working section 80 is small, the rotational resistance of the rotor 31 is adjusted by appropriately consuming power output from the power generator 30 by the power consuming section 71, thereby reducing the speed, at which the mainspring is unwound, so as to prevent energy stored in the mainspring from being rapidly wasted. While the power consuming section 71 can adopt various methods for controlling power consumption, the electric characteristic values of circuit elements, such as resistors and coils, to be connected in parallel to the power generator 30 may be controlled. Alternatively, power may be consumed by using a power consuming device, such as a motor. In this case, a mechanism may be adopted in which the mainspring is wound up by the output of the motor.

In a case in which no power is consumed by the working section 80, it is wasteful to consume energy by unwinding the mainspring. Accordingly, in this application, the rotation of the rotor 31 in the power generator 30 can be stopped by a mechanical brake 76. The brake 76 may be formed of an actuator, such as a bimorph element, that is electrically operated. The brake 76 may be operated by power stored in the smoothing capacitor 73 or the auxiliary capacitor 75. When no power is stored in the smoothing capacitor 73 or the auxiliary capacitor 75, or when the amount of stored power is equal to or less than a predetermined amount, the brake 76 releases the rotor 31 so that braking force is not applied thereto. Therefore, in a state in which no power is stored in the above capacitor or the amount of stored power is equal to or less than a predetermined amount, when the mainspring starts to be wound up by a driving lever, the rotor 31 automatically rotates and starts power generation. When the voltage of the smoothing capacitor 73 or the auxiliary capacitor 75 is increased above a predetermined value by the power supplied from the power generator 30, the brake 76 stops the rotor 31 so as to restrain energy stored in the mainspring from being consumed.

Even when the output voltage of the power generator 30 driven by the rotating force of the mainspring is low, the voltage increasing and decreasing circuit 74 increases output current so as to obtain a predetermined amount of power even when the rotating speed of the rotor 31 is low. For example, in a case in which sufficient output torque of the mainspring can be obtained, the voltage on the side of the power generator 30 is lowered, is increased by the voltage increasing and decreasing circuit 74, and is then supplied to the working section 80. In contrast, since the output current of the power generator 30 is decreased when the output torque of the mainspring is decreased, the voltage increasing operation of the voltage increasing and decreasing circuit 74 is stopped so that low output current can be obtained from the power generator 30 at high output voltage. This makes it possible to obtain a predetermined output voltage and current even when the mainspring is unwound and the output torque is decreased, and to further extend the operating period of the working section 80.

Such control is possible because the electromagnetic brake of the power generator 30 has a property of being substantially proportional to the output current and the releasing (unwinding) speed of the mainspring can be controlled by the property. When the output torque of the mainspring is high, the electromagnetic brake of the power generator 30 is increased by decreasing the output voltage and increasing the output current. When the output torque of the mainspring is low, the electromagnetic brake of the power generator 30 is decreased by increasing the output voltage and decreasing the output current. This makes it possible to extend the allowable range of driving output of the mainspring which can operate the power generator 30. From the viewpoint of energy to be supplied from the mainspring to the power generator 30, necessary energy is supplied at a low rotor rotation speed when the output torque of the mainspring is high, and supply energy is ensured by increasing the rotor rotation speed when the output torque of the mainspring is low.

The above-described control is an example in which dynamic energy of the driving lever is temporarily stored in the mainspring of the movement barrel 21, and transmission of the dynamic energy is smoothed in respect of time, that is, energy is transmitted to the power generator 30 with a reduced amount of change in energy to be fed. While the feeding speed of energy from the mainspring serving as a first conversion and storage portion to the power generator 30 serving as a second conversion and storage portion may be controlled by operating the power generator 30 and the output side thereof, as described above, the flow of energy to the second conversion and storage portion can be smoothed by outputting the energy to the second conversion and storage portion with the amount of energy controlled by the first conversion and storage portion itself.

While the amount of power to be supplied (the amount of power to be generated by the power generator 30) is controlled by the power control section 70 in accordance with the power consumption state of the working section 80 in this application, generated power may be stored in a storage means formed of a secondary battery, such as a mass capacitor or a chemical battery, without such control.

[Second Application]

Figure 7:
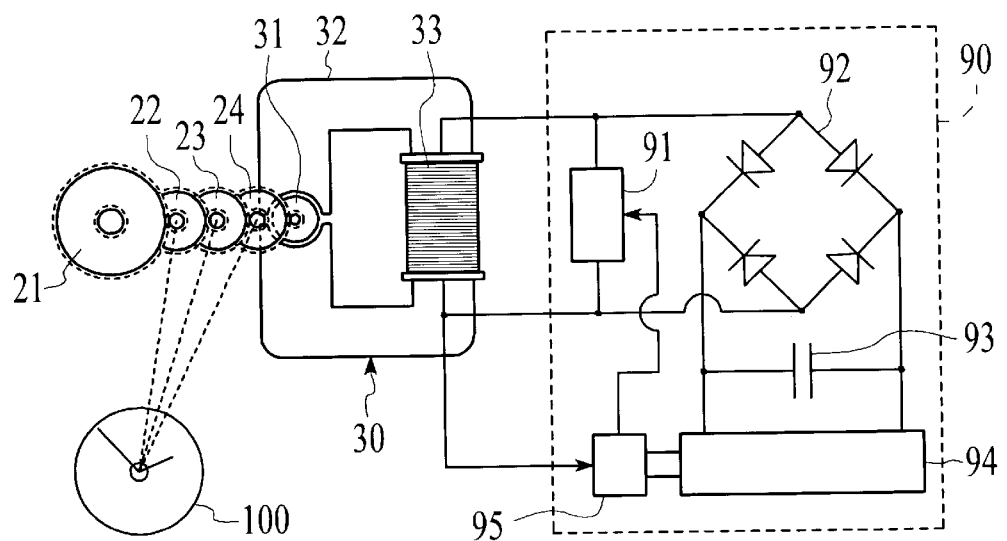
FIG. 7 is a general structural view showing the electrical configuration of a second application to which the embodiments of the present invention are applied.

A second application of the present invention will now be described with reference to FIG. 7. This application shows an example of configuration of an electronically controlled mechanical timepiece in which pointers are rotationally driven by a rotation transmitting section, such as gears 22, 23, and 24, to be rotationally driven by a mainspring of the movement barrel 21 in the above embodiments and in which the moving speed of the pointers is controlled by an electromagnetic brake of the power generator 30 so as to be constant. Any of the first and second embodiments may also be applied to the second application.

In the second application, rotation is derived from an appropriate part of a transmission gear train composed of gears 22, 23, and 24 for transmitting rotation from a mainspring to a power generator 30 so as to rotationally drive pointers (e.g., an hour hand, a minute hand, and a second hand) disposed in a pointer section 100. Output from the power generator 30 is supplied to a power control section 90. The power control section 90 comprises a variable load circuit 91 capable of changing the load, such as a resistance between output terminals of an electromagnetic coil 33, a rectifying circuit 92 for rectifying alternating current output from the power generator 30, a secondary battery 93, such as a mass capacity or a storage battery, for storing electric power output from the rectifying circuit 92, a timepiece control circuit 94 to be operated by electric power output from the secondary battery 93, and a load control circuit 95 for detecting the period of an alternating output from the power generator 30 and controlling the load of the variable load circuit 91 in a manner in accordance with the period according to a control command given from the timepiece control circuit 94.

Alternating current output from the power generator 30 is converted into direct current by the rectifying circuit 92 and is stored in the secondary battery 93. The timepiece control circuit 94 is operated by the output from the secondary battery 93. The timepiece control circuit 94 has a clock signal generating means, such as a quartz oscillator, therein, and generates a control command (a signal having a period corresponding to the pointer moving speed of the timepiece) to be sent to the load control circuit 95 based on clock signals generated by the clock signal generating means. The load control circuit 95 detects the period of alternating current generated by electromotive force of the electromagnetic coil 33 of the power generator 30, compares the detected period and the above control command received from the timepiece control circuit 94, and sends a control signal to the variable load circuit 91 in order to synchronize the rotation period of the power generator with the period of the control signal. Since the variable load circuit 91 forms an adjusted load based on the control signal, the power generator 30 performs power generation in accordance with the output-side load.

Since the timepiece control circuit 94 and the load control circuit 95 control the variable load circuit 91 so that the period of alternating current output from the power generator 30 is constant, a rotor 31 continues power generation while being controlled so as to obtain a substantially constant rotation speed by being subjected to electromagnetic braking force that increases and decreases according to the load of the variable load circuit 91. As a result, the rotation speed of the transmission gear train is controlled by the rotor 31 so as to be constant. This allows the pointer section 100 rotationally driven by the transmission gear train to tick precisely.

[Third Application]

Structural applications of these embodiments will now be described with reference to FIGS. 8 to 16.

Figure 8:
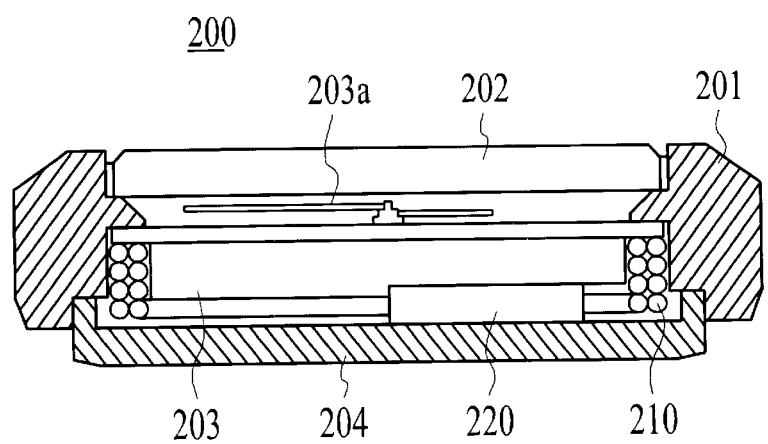
FIG. 8 is a general sectional view showing the inner structure and layout of a third application to which the embodiments of the present invention are applied.

FIG. 8 shows the configuration of a third application. The third application is a structural example in which the present invention is applied to a wristwatch 200 serving as a concrete example of the device. As shown in FIG. 8, the wristwatch 200 has an outer casing (caseband) 201, and a light-transmitting member 202, such as a glass window, is mounted on the front side (upper side in the figure) of the outer casing 201. A movement 203 is housed in the outer casing 201, and an opening of the outer casing 201 is closed by a case back 204 mounted on the back side. A time indicating section 203a, such as a pointer section or a liquid crystal display section, is formed on the front side of the movement 203.

Inside the outer casing 201, a pipelike (tubular) medium containing portion 210, as in the above-described first embodiment and second modification, is placed in a ring-shaped (annular) form on the outer periphery of the movement 203. In the illustrated example, the medium containing portion 210 is wound with two inner and outer circles and also with four stacked turns. The medium containing portion 210 is also placed in close contact with the inner surface of the outer casing 201. The number and shape of windings of the medium containing portion 210 may be appropriately changed according to the shape of an inner space of the outer casing 210 and the shape of the movement 203.

The medium containing portion 210 is connected to a working section 220 placed below the movement 203. In the working section 220, the above-described variable portion and an operating portion (composed of the piston, the pivot lever, the driving lever, and the like described above) are housed, as described in the above embodiments. The operating portion of the working section 220 is engaged with a transmission section housed in the movement 203, such as gears or a driven gear of a movement barrel. Therefore, when the variable portion in the working section 220 is deformed due to a change in ambient temperature and the operating portion is operated by the deformation, the action is transmitted to the transmission section in the movement 203.

In the movement 203 of the third application, a power generator, a control circuit, and the like, similar to those described in the above embodiments, are housed in addition to the transmission section.

In the third application, the pipelike medium containing portion 210 is interposed between the movement 203 and the outer casing 201 in close contact with the inner surface of the outer casing 201. Therefore, the pressure of the heating medium sealed in the medium containing portion 210 changes in response to changes in temperature of the outer casing 201, and the variable portion is deformed due to the pressure change, thereby operating the operating portion. Since the medium containing portion 210 is placed along the outer periphery of the movement 203 in this structure, the external dimensions of the outer casing 201 are barely increased. This allows the timepiece to be made compact and thin.

Instead of the above-described annular shape, the planar shape of the medium containing portion 210 may be appropriately determined in accordance with the planar shape of the outer casing 201, for example, a shape of a rectangular frame.

[Fourth Application]

Figure 9:
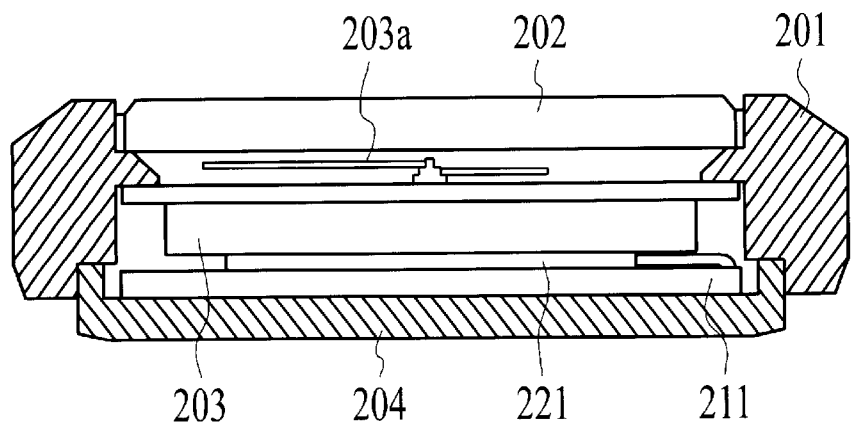
FIG. 9 is a general sectional view showing the inner structure and layout of a fourth application to which the embodiments of the present invention are applied.

A fourth application will now be described with reference to FIG. 9. In the fourth application, the same components as those in the above-described third application are denoted by the same numerals, and description thereof is omitted. In this application, a disklike medium containing portion 211 is placed in close contact with the inner surface of a case back 204. A working section 221 is interposed between the medium containing portion 211 and a movement 203. The medium containing portion 211 is connected to a variable portion held in the working section 221 which is similar to that in the above embodiments. An operating portion connected to the variable portion is also held inside the working section 221 and is connected to a transmission section or the like in the movement 203.

In this application, since the medium containing portion 211 is in close contact with the case back 204 and is shaped like a disk along the case back 204, the contact area with the case back 204 can be increased. Therefore, it is possible to quickly respond to a change in temperature of the case back 204, to seize a small change in temperature, and to thereby derive energy. The planar shape of the medium containing portion 211 is not limited to a circle, but may be appropriately determined (e.g., a rectangle) in accordance with the planar shapes of an outer casing 201 and the case back 204.

[Fifth Application]

Figure 10:
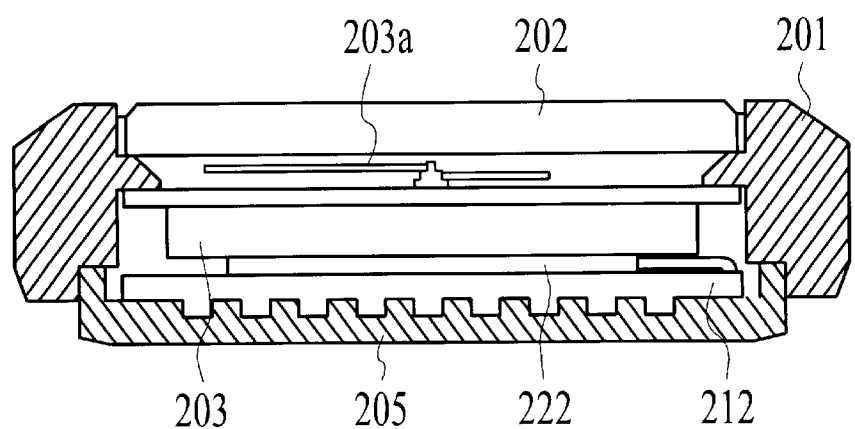
FIG. 10 is a general sectional view showing the inner structure and layout of a fifth application to which the embodiments of the present invention are applied.

A fifth application will now be described with reference to FIG. 10. In the fifth application, the same components as those in the above third application are denoted by the same numerals, and description thereof is omitted. In this application, a disklike medium containing portion 212, which is substantially similar to that in the fourth application, is placed in close contact with a case back 205. This application is similar to the fourth application in that the medium containing portion 212 is connected to a variable portion in a working section 222 and in that an operating portion is held together with the variable portion in the working section 222.

In this application, the case back 205 and the medium containing portion 212 are in close contact with each other, and furthermore, the contact faces of the case back 205 and the medium containing portion 212 are uneven so as to be fitted in each other. Since this increases the contact area between the medium containing portion 212 and the case back 205, it is possible to more sensitively seize a change in temperature of the case back 205. In this case, in order to allow heat to be easily transmitted to heating medium in the medium containing portion 212, it is preferable that not only the outer surface of the medium containing portion 212 be uneven, but also the inner surface thereof be also uneven corresponding to the shape of the outer surface. The planar shape of the medium containing portion 212 is not limited to a circle, but may be appropriately determined (e.g., a rectangle) in accordance with the planar shapes of an outer casing 201 and the case back 204.

[Sixth Application]

Figure 11:
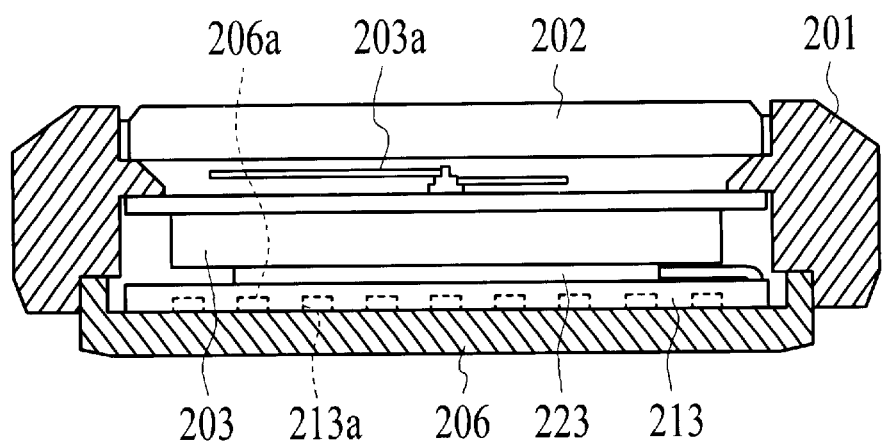
FIG. 11 is a general sectional view showing the inner structure and layout of a sixth application to which the embodiments of the present invention are applied.

A sixth application of the present invention will now be described with reference to FIG. 11. In the sixth application, the same components as those in the above third application are denoted by the same numerals, and description thereof is omitted. In this application, a disklike medium containing portion 213 is placed in close contact with the inner surface of a case back 206. Multiple recesses 213a are formed on the surface of the medium containing portion 213 opposing the case back 206, and multiple protuberances 206a formed on the inner surface of the case back 206 are fitted in the recesses 213a.

A working section 223 is interposed between the medium containing portion 213 and a movement 203. The medium containing portion 213 is connected to a variable portion held in the working section 223 which is similar to that in the above embodiments. An operating portion connected to the variable portion is also held in the working section 223 and is connected to a transmission section or the like in the movement 203.

In this application, the medium containing portion 213 is in close contact with the case back 206 and is shaped like a disk along the case back 206, and the recesses 213a of the medium containing portion 213 and the protuberances 206a of the case back 206 are meshed with each other. Since this increases the contact area with the case back 206, it is possible to quickly respond to a change in temperature of the case back 206, to seize a small temperature change, and to thereby derive energy. In order to allow heat to be easily transmitted to heating medium in the medium containing portion 213, it is preferable that not only the outer surface of the medium containing portion 213 be uneven, but also the inner surface thereof be uneven corresponding to the shape of the outer surface. The planar shape of the medium containing portion 213 is not limited to a circle, but may be appropriately determined (e.g., a rectangle) in accordance with the planar shapes of an outer casing 201 and the case back 206.

[Seventh Application]

Figure 12:
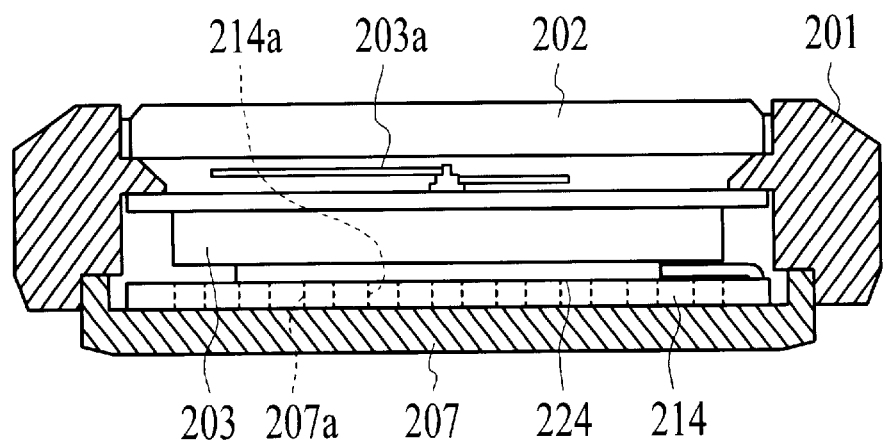
FIG. 12 is a general sectional view showing the inner structure and layout of a seventh application to which the embodiments of the present invention are applied.

A seventh application of the present invention will now be described with reference to FIG. 12. In this application, the same components as those in the above third application are denoted by the same numerals, and description thereof is omitted. In this application, a disklike medium containing portion 214 is interposed between a case back 207 and a movement 203. The medium containing portion 214 is in close contact with the case back 207. The medium containing portion 214 is connected to a working section 224 placed between the movement 203 and the medium containing portion 214, in a manner similar to that in the above applications.

In this application, the medium containing portion 214 is provided with through portions 214a similar to those shown in FIG. 4(b). Protuberances 207a protruding from the inner surface of the case back 207 are fitted in the through portions 214a. Therefore, the contact area between the medium containing portion 214 and the case back 207 can be further increased, and the temperature of the case back 207 can be more efficiently transmitted to heating medium in the medium containing portion 214. This makes it possible to more sensitively seize a change in temperature of the case back 207.

The planar shape of the medium containing portion 214 is not limited to a circle, but may be appropriately determined (e.g., a rectangle) in accordance with the planer shapes of an outer casing 201 and the case back 207.

[Eighth Application]

Figure 13:
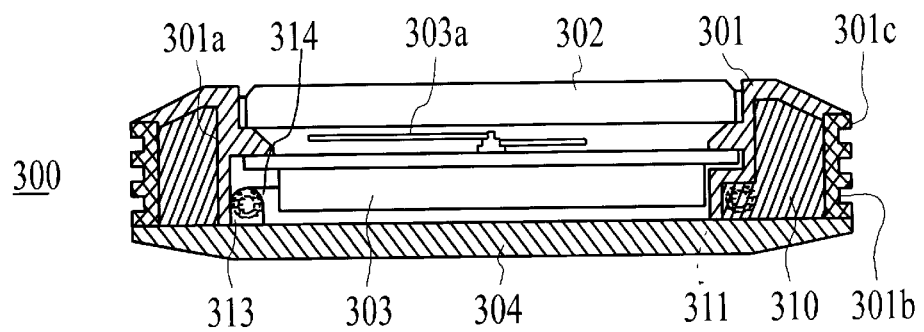
FIG. 13 is a general sectional view showing the inner structure of an eighth application of the present invention.
Figure 14:
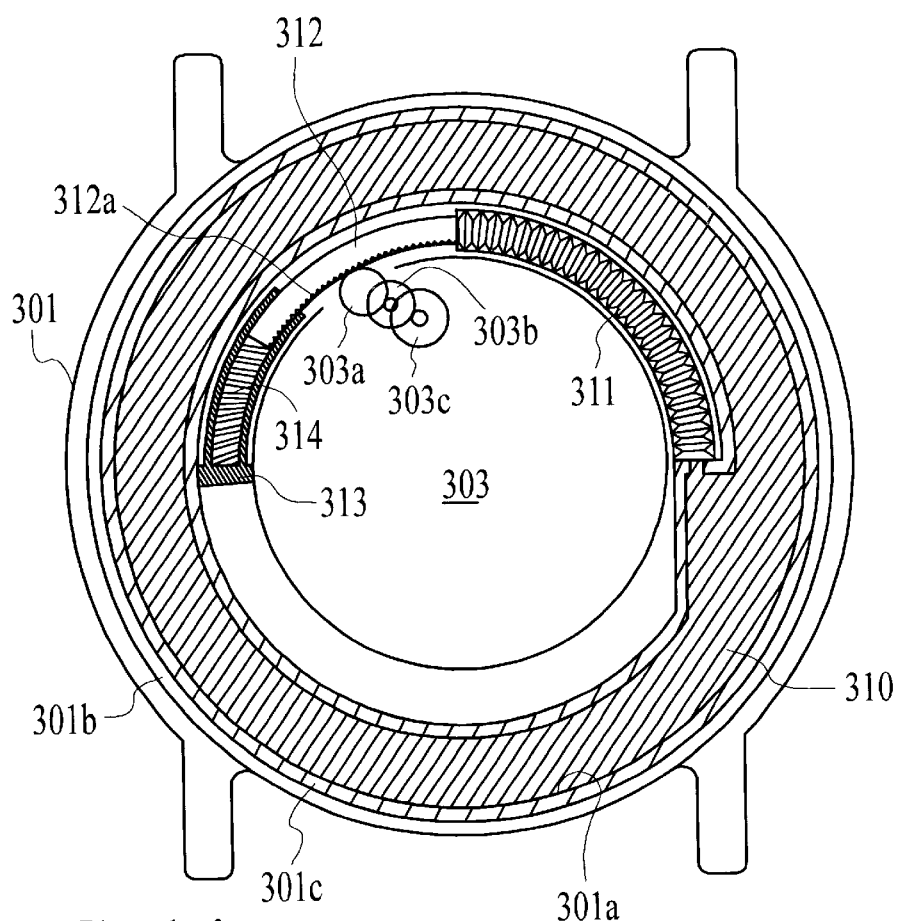
FIG. 14 is a general transverse sectional view showing the inner plan structure of the eighth application.

An eighth application of the present invention will now be described with reference to FIGS. 13 and 14. A wristwatch 300 of the eighth application comprises an outer casing 301, a light-transmitting member 302, a movement 303, and a case back 304, in a manner similar to that in the above third to seventh applications. In this application, a medium containing space 301a is formed inside the outer casing 301 that is entirely annular, and the outer casing 301 itself serves as a medium containing portion. Heating medium 310 similar to the above is contained in the medium containing space 301a and is sealed therein by attaching the case back 304 to the outer casing 301.

A plurality of annular grooves are formed on the outer periphery of the outer casing 301, thereby forming an uneven face structure 301b vertically extending in the figure. The medium containing space 301a is connected to the interior of a variable portion 311 extending in the shape of an arc along the inner side of the outer casing 301. The variable portion 311 is expandable in the extending direction and has, for example, a bellows structure, as shown in the figure. The base end of a driving arm 312 is connected to the leading end of the variable portion 311, and the driving arm 312 is also shaped so as to extend in the shape of an arc along the inner side of the outer casing 301. The leading end of the driving arm 312 is slidably inserted in a cylinder 313 that also extends in the shape of an arc along the inner side of the outer casing 301. The cylinder 313 holds therein an elastic member 314, such as a coil spring, for exerting elastic force in a direction to push the driving arm 312 outside the cylinder 313.

A rack 312a is formed on the inner side face of the driving arm 312. A gear 303a is provided in the movement 303 so as to be meshed with the rack 312a of the driving arm 312. The gear 303a is meshed with a gear 303b, and the gear 303b is meshed with a movement barrel 303c. The gears 303a and 303b constitute a transmission gear train for transmitting the arc-shaped motion of the driving arm 312 into the movement 303 as rotational motion. Rotational energy transmitted by the gears 303a and 303b is stored in a mainspring disposed in the movement barrel 303c.

The entirety of an outer peripheral wall portion 301c of the outer casing 301 having the above-described uneven face structure 301b is made of a material having a higher thermal conductivity than that of other portions. The material of the other portions of the outer casing 301 is, for example, stainless steel, tungsten, an aluminum alloy, titanium, or a titanium alloy. The material of the outer wall portion 301c is a material having a higher thermal conductivity than those of the above materials, for example, gold, silver, copper, aluminum, an aluminum alloy, a magnesium alloy, or a beryllium alloy. It is preferable that the thermal conductivity of the outer wall portion 301c be 55 W·m$^{-1}$·K$^{-1}$ or more so as to be higher than those of iron, stainless steel, and various resins generally used for the outer casing. In particular, it is preferable that the thermal conductivity be 110 W·m$^{-1}$·K$^{-1}$ or more so as to be higher than that of brass generally used for the outer casing.

While the outer casing 301 of this embodiment is provided with the annular outer wall portion 301c having a higher thermal conductivity than that of the other portions, as described above, a plurality of portions having a higher thermal conductivity than that of the other portions may be fitted in the outer peripheral wall portion of the outer casing 301 so as to be arranged in the circumferential direction. That is, the outer wall portion 301c may be continuously formed on the outer periphery of the outer casing 301 or may be formed of a plurality of discrete portions.

The case back 304 is made of a material having a lower thermal conductivity than those of the outer wall portion 301c and any other portions of the outer casing 301. The material of the case back 304 is, for example, various resins, such as acrylic, polyethylene, and polystyrene, glass, ceramic, a solid of various fibers, such as glass fiber, cotton, wool, synthetic fiber, and paper fiber, a plasterboard, or a brick material. A cavity, a groove, or the like may be formed in a part of the casing so as to be used as a thermal barrier. Furthermore, the case back 304 may be connected to the outer casing 301 or the medium containing space 301a via the above-described appropriate thermal barrier. In this case, satisfactory heat-insulating effects can be obtained even when the case back 304 itself is not made of a low-thermal-conductivity material. It is preferable that the thermal conductivity of the heat insulation barrier be 10 $W \cdot m^{-1} \cdot K^{-1}$ or less so as to be lower than that of stainless steel generally used for the outer casing. In particular, it is preferable that the thermal conductivity be 3 $W \cdot m^{-1} \cdot K^{-1}$ or less so as to be equivalent to or less than those of glass, mullite ceramic, and steatite ceramic which are fire-resistant materials.

In the eighth application, since the medium containing space 310 is formed inside the outer casing 301, heat exchange performance between the outside and the heating medium is improved, and as a result, the amount of operation of the variable portion 311 is increased. This makes it possible to increase the amount of energy to be derived via a mainspring mechanism and a power generator built in the movement 303.

The variable portion 311 and the driving arm 312 forming the operating portion are arranged along the inner side of the outer casing 301 and are deformed and operated therealong. Since this allows the variable portion and the operating portion to be housed in a compact space, it is possible to improve space efficiency and to reduce the size of the overall device. Such a structure is significant, particularly in portable devices such as wristwatches and portable telephones.

Since the eighth application adopts the configuration in which the variable portion and the operating portion are housed in a space between the outer casing 301 and the movement 303, the entire casing can be made compact and thin. Since both the outer casing 301 and the movement 303 are disk-shaped in the eighth application, the variable portion and the operating portion also extend in the shape of an arc and are deformed and operated in the extending direction. Therefore, it is possible to make the components compact and to improve space efficiency in the outer casing.

Furthermore, since only the outer wall portion 301c of the outer casing 301 is made of a high-thermal-conductivity material in order to improve heat exchange performance with the outside, selective heat exchange with a desired external portion is possible. Since the outer wall portion 301c is formed in a part of the outer casing 301, the cost of procuring the material for the casing can be reduced to be lower than that in a case in which the entire outer casing is made of a high-thermal-conductivity material. This makes it possible to ensure superior strength and corrosion resistance of the casing and to improve workability of the components of the casing.

[Ninth Application]

Figure 15:
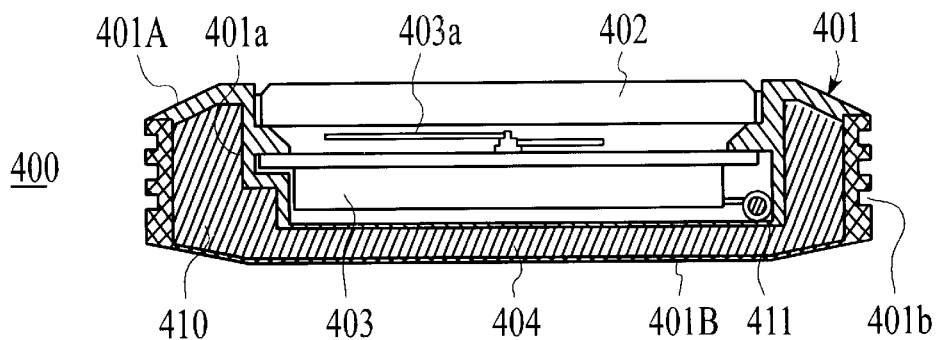
FIG. 15 is a general sectional view showing the inner structure of a ninth application of the present invention.
Figure 16:
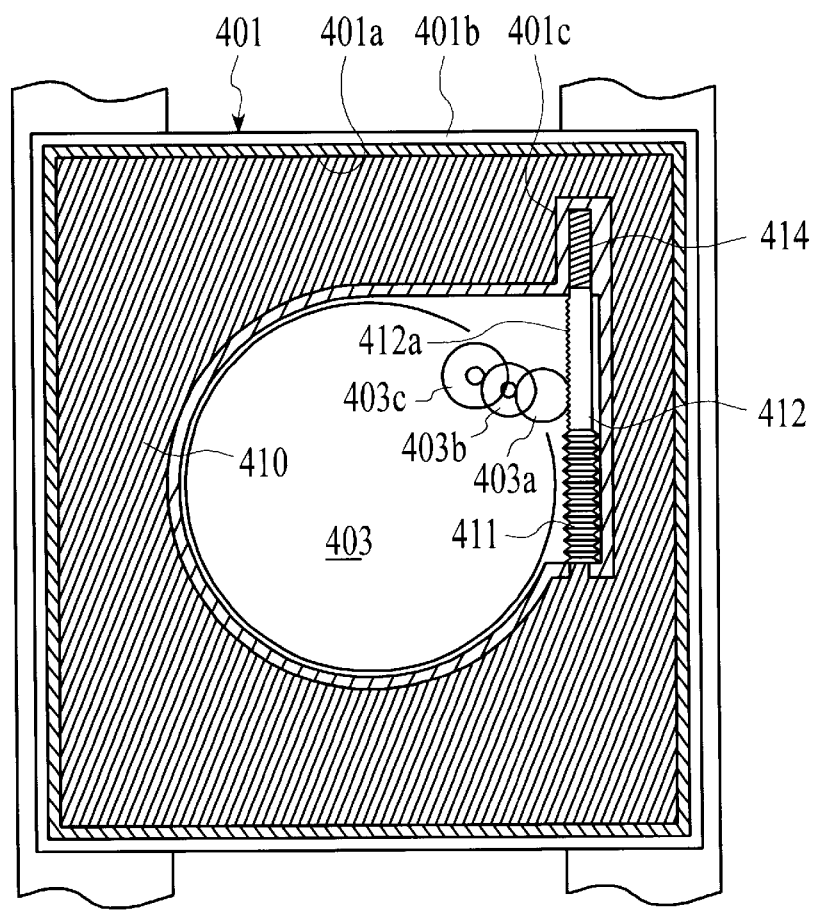
FIG. 16 is a general transverse sectional view showing the inner plan structure of the ninth application.

A ninth application of the present invention will now be described with reference to FIGS. 15 and 16. A wristwatch 400 in the ninth application comprises an outer casing 401, a light-transmitting member 402, and a movement 403, in a manner similar to that in the above eighth application.

In this application, the outer casing 401 has a one-piece structure in which a portion corresponding to a case back (a portion positioned corresponding to the case back 304 in the eighth application) is integrally formed, which is different from the eighth application. The outer casing 401 is composed of an upper member 401A having an upper peripheral portion and a holding recess for holding the light-transmitting member 402 and the movement 403 therein, and a lower member 401B fixed to the upper member 401A and having a higher thermal conductivity than that of the upper member 401A. The upper member 401A is made of a material similar to that of the other portions of the outer casing 301 in the above eighth application, and the lower member 401B is made of a material similar to that of the outer wall portion 301c of the outer casing in the eighth application.

A medium containing space 401a is formed between the upper member 401A and the lower member 401B, and heating medium 410 similar to the above is sealed therein. The medium containing space 401a is formed so as to also lie on the inner side of the portion of the one-piece outer casing 401 corresponding to the case back. A plurality of annular grooves similar to those in the eighth application are vertically arranged on the outer peripheral end faces of the lower member 401B of the outer casing 401, thereby forming an uneven surface structure 401b.

The medium containing space 401a of the outer casing 401 is connected to the interior of a variable portion 411. The variable portion 411 has a bellow structure that is expandable in the extending direction, in a manner similar to that in the above embodiments. The leading end of the variable portion 411 is connected to a driving arm 412. The driving arm 412 is slidably inserted in a cylindrical portion 401c formed inside the outer casing 401, and is urged by an elastic member 414, such as a coil spring, held in the inner portion of the cylindrical portion 401c in such as direction that it is pushed outside the cylindrical portion 401c.

A rack 412a is formed on the side face of the driving arm 412. The rack 412a is meshed with a gear 403a disposed in the movement 403, the gear 403a is meshed with a gear 403b, and the gear 403b is meshed with a movement barrel 403c. Rotational energy to be transmitted by a transmission gear train composed of the gears 403a and 403b is stored in a mainspring disposed in the movement barrel 403c.

In the ninth application, the outer casing 401 has a rectangular outline in plan view. The variable portion 411 and the driving arm 412 corresponding to the operating portion linearly extend nearly along the outline of the outer casing 401, and are deformed and operated in the extending direction. In this way, the variable portion and the operating portion can be formed so as to have the shape best-suited to the structure of the device and to be deformed and operated in the optimum direction.

The configuration of this embodiment allows heat exchange to be smoothly made between the outer peripheral wall portion and the portion corresponding to the case back of the outer casing 401 and the heating medium 410.

Therefore, in a state in which the wristwatch 400 is worn on the wrist or the like, body heat can be easily transmitted to the heating medium 410 via the portion corresponding to the case back, and outside air heat can be transmitted to the heating medium 410 via the uneven face structure 410b of the outer peripheral wall portion. In contrast, in a state in which the wristwatch 400 is not worn on the wrist, outside air heat can be efficiently transmitted to the heating medium 410 via both the outer peripheral wall portion and the portion corresponding to the case back. Accordingly, the temperature of the heating medium 410 changes suddenly when the wristwatch 400 is put on the wrist and when the wristwatch 400 is taken off the wrist, whereby energy can be derived. Energy can also be derived by changes in outside air temperature via the uneven face structure 401b of the outer wall portion.

[Third Embodiment]

A thermal energy conversion method according to an embodiment (third embodiment) of the present invention will now be described with reference to FIG. 17. This embodiment shows a method that can be carried out by using the above-described wristwatch 300 of the eighth application. The embodiment is carried out in a state in which a heat converter is composed of a medium containing portion containing a heating medium and a variable portion with its interior connected to the interior of the medium containing portion, which are provided in the thermal energy conversion devices of the above embodiments, and in which an appropriate operating portion and a conversion and storage portion are provided for the heat converter.

Figure 17:
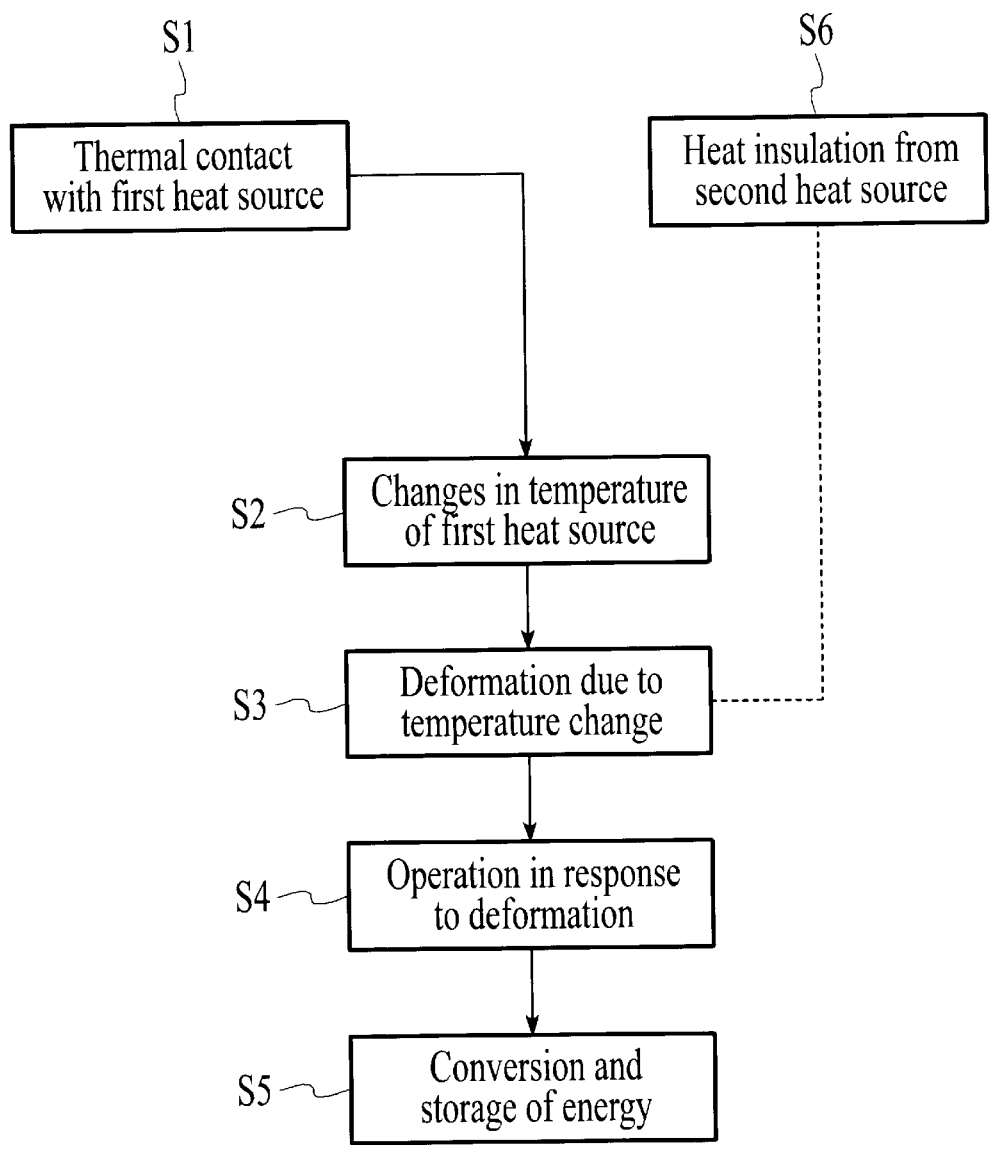
FIG. 17 is a general flowchart showing a thermal energy conversion method according to an embodiment (third embodiment) of the present invention.

As shown in FIG. 17, first, the medium containing portion is brought into thermal contact with a first heat source in Step S1. When a change in temperature occurs in the first heat source in this state in Step S2, the temperature of the heating medium in the medium containing portion changes, and a change in capacity (deformation) of the variable portion is caused in Step S3 due to the change in volume of the heating medium. Subsequently, the operating portion is actuated by the deformation of the variable portion in Step S4, and dynamic energy thereof is converted into an appropriate form of energy and is stored in the conversion and storage portion in Step S5.

In this case, the outside air is used as the first heat source, as described in the eighth application. The temperature of the outside air varies with time, and in particular, goes through a cycle of increase and decrease in the course of a day. It is advantageous to use the outside air as the first heat source in that thermal contact can be established merely by exposing the medium containing portion or the casing covering the portion to the outside air and in that it is unnecessary to prepare an additional heat source and to make preparations for thermal contact with the heat source.

In this case, the medium containing portion may be placed adjacent to or in contact not only with the first heat source but also with another second heat source for reasons of structure and layout. For example, in the above eighth application, the outer casing is in contact with the outside air, whereas the case back is in contact with the wrist serving as a second heat source. Since the wrist is a heat source whose temperature is maintained substantially constant by body heat, thermal contact of the medium containing portion with the wrist hinders temperature changes of the heating medium. In such a case in which the medium containing portion is disposed adjacent to or in contact with the second heat source which is less likely to be changed in temperature than the first heat source, it is preferable to properly establish thermal insulation between the second heat source and the medium containing portion in Step S6, for example, by making the case back of a low-thermal-conductivity material, and to thereby reduce the degree at which the second heat source hinders temperature changes of the heating medium.

[Fourth Embodiment]

Figure 18:
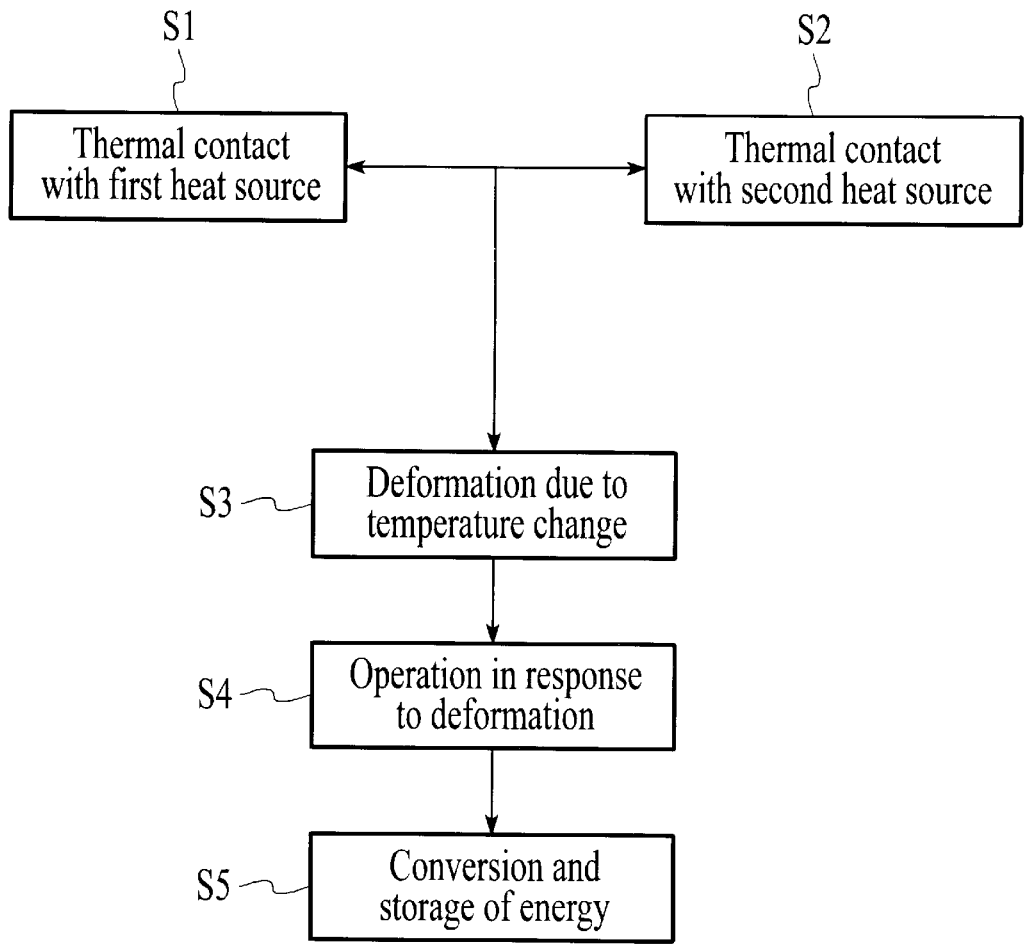
FIG. 18 is a general flowchart showing a thermal energy conversion method according to an embodiment (fourth embodiment) of the present invention.

Finally, a thermal energy conversion method according to another embodiment (fourth embodiment) of the present invention will be described with reference to FIG. 18. In the fourth embodiment, a medium containing portion is shifted between two states, a state in Step S1 in which the medium containing portion is in thermal contact with a first heat source, and a state in Step S2 in which the medium containing portion is in thermal contact with a second heat source having a different temperature from that of the first heat source, thereby causing a change in temperature of heating medium in the medium containing portion. For example, when the medium containing portion is shifted from the state (Step S1) in which it thermally contacts the first heat source to the state (Step S2) in which it thermally contacts the second heat source, the temperature of the heating medium is thereby changed in Step S3. As a result, a variable portion is deformed with its capacity changed due to a change in volume of the heating medium in Step S3. Dynamic energy generated due to the deformation in Step S4 is appropriately converted and stored in Step S5.

As a specific example of this embodiment, a state in which the heating medium in the medium containing portion is heated by body heat and a state in which the heating medium is cooled by the outside air may be switched by putting the wristwatch of the ninth application on the wrist and taking the wristwatch off the wrist.

When the medium containing portion is in thermal contact with the first heat source (e.g., the wrist), it may also be in thermal contact with the second heat source (e.g., the outside air).

Energy may be derived by a combination of the fourth embodiment and the above third embodiment. That is, in the fourth embodiment, in a case in which at least one of the first heat source and the second heat source causes such a sufficient temperature change that energy may be derived, while the medium containing portion is in thermal contact with the heat source, energy can be derived by a change in temperature of the heating medium resulting from a change in temperature of the heat source.

The thermal energy conversion device, the unit having the device, and the thermal energy conversion method according to the present invention are not limited to the above-described embodiments carried out by the devices and circumstances shown in the figures. The present invention is applicable not only to the wristwatch, but also to various electronic devices including portable electronic devices, such as a desktop calculator, a portable audio device, a portable telephone, an information terminal, and a personal computer, to playthings (toys, electronic toys), and the like. Various modifications are, of course, possible without departing from the spirit of the present invention.

INDUSTRIAL APPLICABILTY

As described above, according to the present invention, the variable portion can be sensitively and quickly deformed in response to a considerably slow and slight change in temperature of, for example, ordinary outside air, and in response to a sudden temperature change caused when the device is moved from indoors into outdoors and is returned again to indoors, or when the device is placed out of close contact with the skin and is then put into close contact therewith again, thereby deriving dynamic energy of the operating portion from the deformation. This makes it possible to derive greater amounts of energy than in the conventional art and to efficiently derive energy without restraining the operation of the operating portion, as in the conventional art, or even when the restraint of operation is reduced. In particular, the device, the unit, and the method provide practical and pronounced advantages by being adopted in portable devices and accessories which consume energy.

What is claimed is:

1. A thermal energy conversion device, comprising:
    a heat converter having a sealed container for containing a heating medium that changes in volume in response to a change in temperature, said sealed container having no member extending from within the interior of said sealed container to its exterior, said sealed container including a medium containing portion, which does not substantially change in volume capacity, and a variable portion connected to said medium containing portion so as to be changeable in volume capacity, the volume capacity of said medium containing portion being at least ten times greater than the maximum volume capacity of said variable portion; and
    an operating portion to be operated in response to a change in volume capacity of said variable portion.

2. A thermal energy conversion device, comprising:
    a heat converter having a sealed container for containing a heating medium that changes in volume in response to a change in temperature, said sealed container including a non-expandable portion and an expandable portion, said non-expandable portion having a substantially unchanging volume capacity, said expandable portion having a variable volume capacity and being connected to said non-expandable portion so as to expand and contract in response to a corresponding change in the volume of said heating medium;
    an enclosure for enclosing said expandable portion;
    a movable shaft having a base in contact with said expandable portion within said enclosure, and having an arm extending from said base through a wall of said enclosure to the exterior of said enclosure;
    a first resilient member within said enclosure between said wall and said base for maintaining said base in constant contact with said expandable portion, and;
    a second resilient member outside said enclosure for applying a compression force to an end of said shaft opposite said base.

3. A thermal energy conversion device according to claim 2, wherein said non-expandable portion is an elongated, tubular enclosure having a spiral shape expanding outward from a center point.

4. A thermal energy conversion device according to claim 1, wherein said medium containing portion is a tubular enclosure of constant diameter and having a spiral shape expanding outward from a center point.

5. A thermal energy conversion device, comprising:
    a heat converter having a sealed container for containing a heating medium that changes in volume in response to a change in temperature, said sealed container including a medium containing portion, which does not substantially change in volume capacity, and a variable portion connected to said medium containing portion so as to be changeable in volume capacity; and
    an operating portion to be operated in response to a change in volume capacity of said variable portion;
    wherein said variable portion protrudes from said medium containing portion, and the sectional area of said variable portion taken along a plane orthogonal to the protruding direction of said variable portion is less than the sectional area of said medium containing portion taken along said plane in an area connected to said variable portion.

6. A thermal energy conversion device according to claim 1, wherein said variable portion is expandable in a predetermined direction, and said operating portion is reciprocally movable in said predetermined direction in response to expansion and contraction of said variable portion, said thermal energy conversion device further including:
    an enclosure for enclosing said variable portion;
    a movable shaft having a base in contact with said variable portion within said enclosure, and having an arm extending from said base through a wall of said enclosure in the direction of said predetermined direction to the exterior of said enclosure;
    a first resilient member within said enclosure between said wall and said base for maintaining said base in constant contact with said variable portion, and;
    a second resilient member outside said enclosure for applying a compression force to an end of said shaft opposite said base.

7. A thermal energy conversion device according to claim 1, further comprising:
    storage means for storing dynamic energy of said operating portion.

8. A thermal energy conversion device according to claim 7, wherein a first storage portion for temporarily storing dynamic energy of said operating portion and a second storage portion for storing the energy output from said first storage portion again are provided as said storage means.

9. A thermal energy conversion device according to claim 8, wherein a change in energy conversion efficiency of said first storage portion with respect to the amount of input energy is gentler than that of said second storage portion.

10. A thermal energy conversion device according to claim 8, further comprising:
    control means for controlling the amount of energy to be fed from said first storage portion to said second storage portion.

11. A thermal energy conversion device, comprising:
    a heat converter having a sealed container for containing a heating medium that changes in volume in response to a change in temperature, said sealed container including a medium containing portion, which does not substantially change in volume capacity, and a variable portion connected to said medium containing portion so as to be changeable in volume capacity; and
    an operating portion to be operated in response to a change in volume capacity of said variable portion;
    storage means for storing dynamic energy of said operating portion, said storage means including a first storage portion for storing dynamic energy of said operating portion and a second storage portion for storing energy transferred out from said first storage portion; and
    control means for controlling the amount of energy to transferred from said first storage portion to said second storage portion;
    wherein said control means controls the energy feeding amount so as to reduce changes in the amount of energy to be stored in said second storage portion, and said second storage portion is connected to an energy consuming portion for consuming the energy stored in said second storage portion, wherein said control means further stops the transfer of energy to said second storage portion when the amount of energy in stored in said second storage portion reaches a predetermined threshold value.

12. A thermal energy conversion device according to claim 11, wherein said energy consuming portion consumes power intermittently; and said control means is further effective of determining when said energy consuming portion is not consuming power and for stopping the transfer of energy to said second storage portion when said energy consuming portion is not consuming power.

13. A thermal energy conversion device according to claim 12, further comprising:

a driven portion to be driven by energy fed from said first storage portion in an operation manner in accordance with the feeding amount.

14. A thermal energy conversion device according to claim 8, wherein said first storage portion is a mechanical energy storage means for converting dynamic energy of said operating portion into mechanical energy and temporarily storing the converted energy, and said second storage portion includes power-generating means for converting the mechanical energy output from said first storage portion into electrical energy and storage means for storing the electrical energy obtained from said power-generating means.

15. A unit having a thermal energy conversion device according to claim 1.

16. A unit having a thermal energy conversion device according to claim 15, further comprising:

a case member for housing said thermal energy conversion device, wherein said medium containing portion is placed along the inner surface of said case member.

17. A unit having a thermal energy conversion device according to claim 16, wherein said case member and the outer wall of said medium containing portion are in close contact with each other or are integrally formed.

18. A unit having a thermal energy conversion device according to claim 16, wherein said case member is provided with a heat path extending from the outer surface of said case member to a position facing said medium containing portion and having a higher thermal conductivity than that of other portions.

19. A unit having a thermal energy conversion device according to claim 16, wherein said case member selectively has an uneven shape on a portion of the outer surface facing said medium containing portion.

20. A unit having a thermal energy conversion device according to claim 16, wherein a portion of said case member adjacent to said medium containing portion selectively has a heat-insulating portion having a lower thermal conductivity than that of other portions.

21. A unit having a thermal energy conversion device according to claim 16, wherein said unit is an electronic device.

22. A thermal energy conversion method comprising:

providing a heat converter formed so as to have a sealed container for containing a heating medium that changes in volume in response to a temperature change, said sealed container having no member extending from within the interior of said sealed container to its exterior, said sealed container being selected to have a medium containing portion that does not substantially change in volume capacity and a variable portion changeable in volume capacity, the volume capacity of said medium containing portion being at least ten times greater than the maximum volume capacity of said variable portion said variable portion being connected to said medium containing portion, and wherein a change in volume is caused in said variable portion by changing the internal temperature of said medium containing portion based on a change in outside air temperature; and generating dynamic energy by said change in volume.

23. A thermal energy conversion method comprising:

providing a heat converter formed so as to have a sealed container for containing a heating medium that changes in volume in response to a temperature change, said sealed container being selected to have a medium containing portion that does not substantially change in volume capacity and a variable portion changeable in volume capacity, the volume capacity of said medium containing portion being at least ten times greater than the maximum volume capacity of said variable portion connecting said variable portion to said medium containing portion, and wherein a change in volume is caused in said variable portion by shifting said medium containing portion from a state in which it is in thermal contact with a first heat source to a state in which it is in thermal contact with a second heat source having a different temperature from that of said first heat source; and generating dynamic energy by said change in volume.

24. A thermal energy conversion method comprising:

providing a heat converter formed so as to have a sealed container for containing a heating medium that changes in volume in response to a temperature change, said sealed container being selected to have a medium containing portion that does not substantially change in volume capacity and a variable portion changeable in volume capacity and connected to said medium containing portion:

forming on the periphery of said medium containing portion a first outer face portion to be contacted with a first heat source and a second outer face portion to be thermally coupled to a second heat source that changes in temperature to a greater degree than that of said first heat source;

placing said medium containing portion in contact with a wall for thermally coupling said second outer face portion to said second heat source, said second outer face portion having a first set of at least one of protrusions and undulations, said wall having a second set of at least the other of protrusions and undulations, the protrusions and undulations of said first set being arranged to mate with corresponding undulations and protrusions of said second set when said second outer face portion is placed in contact with said wall; and selecting the heat exchange efficiency between the outside and said medium containing portion via said first outer face portion to be lower than the heat exchange efficiency between the outside and said medium containing portion via said second outer face portion.

25. A thermal energy operated timepiece comprising:

a gearing system for tracking the passage of time;

a reservoir container having a substantially unchanging volume capacity, the exterior of said reservoir container forming an open space such that the perimeter wall around said open space is defined by the exterior of said reservoir container, said gearing system being located within said open space surrounded by said reservoir container;

an expandable receptacle having a variable volume capacity, said expandable receptacle being coupled to said reservoir container to form a sealed container for holding a thermally responsive substance whose volume varies with temperature, said gearing system being coupled to respond to the motion of said expandable receptacle.

26. The thermal energy operated timepiece of claim 25, further comprising:

an encasement forming a housing for said timepiece; wherein part of the outer perimeter of said reservoir container constitutes outer walls of said encasement.

27. The thermal energy operated timepiece of claim 25, further comprising:

an encasement forming a housing for said timepiece; wherein part of the outer perimeter of said reservoir container is in abutment contact with the inner walls of said encasement.

28. The thermal energy operated timepiece of claim 25, wherein said reservoir container extends to form a floor across said open space, said floor and open space constituting a cavity defined by the exterior of said reservoir container such that said gearing system is housed within said cavity.

29. The thermal energy operated timepiece of claim 25, wherein said reservoir container is an elongated tube having multiple windings stacked upon each other and surrounding said gearing system to form said perimeter wall around said open space.

30. The thermal energy operated timepiece of claim 25, wherein said reservoir container has a volume capacity at least ten times greater than the maximum volume capacity of said expandable receptacle.

31. The thermal energy operated timepiece of claim 25, further comprising:

an enclosure for enclosing said expandable receptacle;

a movable shaft having a base in contact with said expandable receptacle within said enclosure, and having an arm extending from said base through an opening in said enclosure to the exterior of said enclosure;

a first resilient member within said enclosure between said opening and said base for maintaining said base in constant contact with said expandable receptacle and;

a second resilient member outside said enclosure for applying a compression force to an end of said shaft opposite said base, said shaft having gear teeth for engaging said gearing system.

32. The thermal energy operated timepiece of claim 25, further comprising:

a first enclosure for enclosing said expandable receptacle;

a second enclosure for housing a resilient member;

a shaft in pressure contact with an end of said expandable receptacle and extending from within said first enclosure to within said second enclosure to make pressure contact with said resilient member;

said first enclosure, second enclosure and shaft being located within said open space between said gearing system and said reservoir container and arranged along said perimeter walls defined by the exterior of said reservoir container.

33. The thermal energy operated timepiece of claim 32, wherein the perimeter walls defining said open space have an annular shape around said gearing system, said first enclosure, second enclosure and shaft each having a curved shape and arranged along a curvature of the perimeter walls.

34. The thermal energy operated timepiece of claim 25, wherein the said timepiece is a watch.

35. A thermal energy operated timepiece comprising:

an encasement forming a housing for said timepiece;

a reservoir container having a substantially unchanging volume capacity, said reservoir container being housed within said encasement and having an outer wall in thermal contact with an interior wall of said encasement, said outer wall having a first set of at least one of protrusions and undulations, said interior wall having a second set of at least one of protrusions and undulations, the protrusions and undulations of said first set being arranged to mate with corresponding undulations and protrusions of said second set when said outer wall is in thermal contact with said interior wall;

an expandable receptacle having a variable volume capacity, said expandable receptacle being housed within said encasement and being coupled to said reservoir container to form a sealed container for holding a thermally responsive substance whose volume varies with temperature;

a gearing system for marking the passage of time, said gearing system being housed within said encasement and being responsive to the motion of said expandable receptacle.

36. The thermal energy operated timepiece of claim 35, wherein said interior wall, to which said outer wall of said reservoir container is in thermal contact, is the base of said encasement, and said gearing system is located over said reservoir container.

* * * * *

UNITED STATES PATENT AND TRADEMARK OFFICE
CERTIFICATE OF CORRECTION

PATENT NO. : 6,427,444 B1
DATED : August 6, 2002
INVENTOR(S) : Kenichi Miyazawa

It is certified that error appears in the above-identified patent and that said Letters Patent is hereby corrected as shown below:

Title page,
Item [54], change "METHOD AND DEVICE FOR CONVERTING THERMAL ENERGY AND DEVICE WITH THE THERMAL ENERGY CONVERTING DEVICE" to -- THERMAL ENERGY CONVERSION DEVICE, UNIT HAVING THE DEVICE, AND THERMAL ENERGY CONVERSION METHOD --.

Signed and Sealed this

Third Day of May, 2005

JON W. DUDAS
*Director of the United States Patent and Trademark Office*